United States Patent
Sha et al.

(10) Patent No.: US 12,063,622 B2
(45) Date of Patent: Aug. 13, 2024

(54) CELL PROCESSING METHOD, DEVICE, AND SYSTEM

(71) Applicant: ZTE Corporation, Shenzhen (CN)

(72) Inventors: Xiubin Sha, Shenzhen (CN); Bo Dai, Shenzhen (CN); Ting Lu, Shenzhen (CN); Xu Liu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 886 days.

(21) Appl. No.: 16/969,719

(22) PCT Filed: Jan. 10, 2019

(86) PCT No.: PCT/CN2019/071102
§ 371 (c)(1),
(2) Date: Mar. 31, 2021

(87) PCT Pub. No.: WO2019/157890
PCT Pub. Date: Aug. 22, 2019

(65) Prior Publication Data
US 2021/0235415 A1   Jul. 29, 2021

(30) Foreign Application Priority Data
Feb. 13, 2018 (CN) .......................... 201810150922.9

(51) Int. Cl.
*H04W 68/02* (2009.01)
*H04W 36/00* (2009.01)
(Continued)

(52) U.S. Cl.
CPC ....... *H04W 68/02* (2013.01); *H04W 36/0061* (2013.01); *H04W 36/0083* (2013.01); *H04W 76/27* (2018.02); *H04W 76/28* (2018.02)

(58) Field of Classification Search
CPC ...... H04W 68/02; H04W 76/27; H04W 76/28
See application file for complete search history.

(56) References Cited

U.S. PATENT DOCUMENTS

| | | | |
|---|---|---|---|
| 9,591,610 B1* | 3/2017 | Sarkar | H04W 68/02 |
| 10,212,690 B1* | 2/2019 | Lau | H04W 64/00 |

(Continued)

FOREIGN PATENT DOCUMENTS

| | | |
|---|---|---|
| CN | 101426307 A | 5/2009 |
| CN | 101651961 A | 2/2010 |

(Continued)

OTHER PUBLICATIONS

LG Electronics Inc., "Enhancement RRC Connection Re-establishment in NR", 3GPP TSG-RAN WG2 AH Meeting, R2-1706805, Jun. 29, 2017, Qingdao, China (3 pages).

(Continued)

*Primary Examiner* — Melanie Jagannathan
(74) *Attorney, Agent, or Firm* — Foley & Lardner LLP

(57) ABSTRACT

Disclosed are a cell processing method, apparatus and system. The cell processing method includes: a first communication node sends multiple neighbor cell lists; where the neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network.

6 Claims, 9 Drawing Sheets

(51) Int. Cl.
*H04W 76/27* (2018.01)
*H04W 76/28* (2018.01)

(56) References Cited

U.S. PATENT DOCUMENTS

| | | | |
|---|---|---|---|
| 2010/0081454 A1* | 4/2010 | Wang | H04W 68/02 |
| | | | 455/458 |
| 2014/0274055 A1 | 9/2014 | Sriram et al. | |
| 2015/0173121 A1 | 6/2015 | Miklos et al. | |
| 2016/0270027 A1* | 9/2016 | Ang | H04W 68/00 |
| 2016/0286385 A1* | 9/2016 | Ryu | H04W 68/00 |
| 2017/0273136 A1* | 9/2017 | Siomina | H04W 52/0216 |
| 2017/0347391 A1* | 11/2017 | Tenny | H04B 7/0617 |
| 2018/0054799 A1* | 2/2018 | Starsinic | H04W 52/0225 |
| 2018/0091968 A1* | 3/2018 | Ly | H04W 36/0061 |
| 2018/0184398 A1* | 6/2018 | Al | H04W 52/0216 |
| 2019/0132900 A1 | 5/2019 | Hong et al. | |
| 2020/0084717 A1* | 3/2020 | Höglund | H04W 52/0216 |
| 2020/0100080 A1* | 3/2020 | Mladin | H04W 4/70 |
| 2020/0314752 A1* | 10/2020 | Haque | H04W 52/0229 |
| 2021/0282042 A1* | 9/2021 | Park | H04W 24/10 |
| 2024/0080739 A1* | 3/2024 | Chen | H04W 36/305 |

FOREIGN PATENT DOCUMENTS

| | | |
|---|---|---|
| CN | 101772098 A | 7/2010 |
| CN | 102685833 A | 9/2012 |
| CN | 103338473 A | 10/2013 |
| CN | 103609166 A | 2/2014 |
| CN | 103889010 A | 6/2014 |
| CN | 104956726 A | 9/2015 |
| CN | 106954258 A | 7/2017 |
| CN | 107548133 A | 1/2018 |
| CN | 101902788 A | 12/2020 |
| JP | 2014-531856 A | 11/2014 |
| JP | 2016-513380 A | 5/2016 |
| KR | 10-2017-0125296 A | 11/2017 |
| WO | WO-2014/166456 A2 | 10/2014 |
| WO | WO-2017/121197 A1 | 7/2017 |
| WO | WO-2017/133463 A1 | 8/2017 |
| WO | WO-2017/173158 A1 | 10/2017 |

OTHER PUBLICATIONS

Second Office Action for JP Appl. No. 2020-543000, dated Oct. 11, 2022 (with English translation, 5 pages).
3GPP: "Evolved Universal Terrestrial Radio Access (E-UTRA) User Equipment (UE) procedures in idle mode (Release 14)" Technical Specification Group Radio Access Network; 3GPP TS 36.304; V14.5.0; Dec. 2017; Valbonne, France (49 pages).
Ericsson: "Issues identified by the latest WF document" 3GPP TSG-RAN WG3 Meeting #93bis; R3-162436; Oct. 14, 2016; Sophia Antipolis, France (5 pages).
Extended European Search Report for EP Appl. No. 19755179.9, dated Nov. 5, 2021 (11 pages).
LG Electronics Inc.: "Discussion on inactive mode in NR" 3GPP TSG-RAN WG3 Meeting #93bis; R3-162362; Oct. 14, 2016; Sophia Antipolis, France (2 pages).
First Office Action for JP Appl. No. 2020-543000, dated Nov. 30, 2021 (with English translation, 8 pages).
Ericsson, "DRX in idle state" 3GPP TSG-RAN WG2 #99bis, R2-1711367, Oct. 13, 2017, Prague, Czech Republic (5 pages).
First Office Action for CN Appl. No. 202210024194.3, dated Jun. 15, 2022 (with English translation, 15 pages).
Huawei, "Introduction of NB-Iot" 3GPP TSG-RAN WG2 NB-IOT Adhoc Meeting, R2-160534, Jan. 21, 2016, Budapest, Hungary (283 pages).
International Search Report for corresponding application PCT/CN2019/071102 filed Jan. 10, 2019; Report dated Mar. 29, 2019.
First Office Action for CN Appl. No. 201810150922.9, dated Nov. 25, 2023 (with English translation, 13 pages).
LG Electronics Inc., "Discussion on issues regarding paging in eDRX", 3GPP TSG-RAN WG3 Meeting #90, R3-152625, Nov. 20, 2015, Anaheim, USA (2 pages).
Office Action for KR Appl. No. 10-2020-7026450, dated Apr. 3, 2024 (with English translation, 7 pages).
Second Office Action for CN Appl. No. 201810150922.9, dated May 11, 2024 (with English translation, 16 pages).

* cited by examiner

CELL PROCESSING METHOD, DEVICE, AND SYSTEM

CROSS-REFERENCE TO RELATED APPLICATIONS

The present application is a U.S. National Stage Application under 35 U.S.C. 371 of International Patent Application No. PCT/CN2019/071102, filed on Jan. 10, 2019, which claims priority to Chinese patent application No. 201810150922.9 filed on Feb. 13, 2018, the content of each of which is incorporated herein by reference in its entirety.

TECHNICAL FIELD

Embodiments of the present application relate to the field of communications and, for example, to a cell processing method, apparatus, and system.

BACKGROUND

At present, since at least one of narrow band internet of things (NB-IoT) and enhanced machine type communication (eMTC) technologies is developed based on long term evolved (LTE) technology, at least one of an NB-IoT base station and an eMTC base station can only access a 4G core (evolved packet core network, EPC) network; however, with the research on 5G technology, a core network architecture has also changed, and a 5G core (5GC) network is formed. In order to take use of architectural advantage and flexible network deployment of the 5GC, it is desired that the at least one of the NB-IoT base station and eMTC base station can also access the 5GC.

SUMMARY

Embodiments of the present application provide a cell processing method, apparatus, and system, which can improve cell processing efficiency.

An embodiment of the present application provides a cell processing method, and the method includes: a first communication node sends multiple neighbor cell lists; where the neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network.

An embodiment of the present application provides a cell processing method, and the method includes: a communication node receives multiple neighbor cell lists; where the neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network; when the communication node does not support the second core network, the communication node processes neighbor cells in the neighbor cell list of neighbor cells connected to the first core network; or the communication node processes neighbor cells in the neighbor cell list of neighbor cells connected to only the first core network, and neighbor cells in the neighbor cell list of neighbor cells connected to both the first core network and the second core network; or when the communication node supports the second core network, the communication node processes neighbor cells in all neighbor cell lists.

An embodiment of the present application provides a communication node. The communication node includes a sending module.

The sending module is configured to send multiple neighbor cell lists; where the neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network.

An embodiment of the present application provides a communication node. The communication node includes a receiving module and a processing module.

The receiving module is configured to receive multiple neighbor cell lists; where the neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network.

The processing module is configured to, when the second core network is not supported, process neighbor cells in the neighbor cell list of neighbor cells connected to the first core network; or process neighbor cells in the neighbor cell list of neighbor cells connected to only the first core network, and neighbor cells in the neighbor cell list of neighbor cells connected to both the first core network and the second core network; or when the second core network is supported, process neighbor cells in all neighbor cell lists.

An embodiment of the present application provides a communication node, and the communication node includes a processor and a computer-readable storage medium, where the computer-readable storage medium stores an instruction which, when executed by the processor, implements any one of the above cell processing methods.

An embodiment of the present application provides a computer-readable storage medium on which a computer program is stored, where the computer program is executed by a processor to implement any one of the above cell processing methods.

An embodiment of the present application provides a cell processing system. The cell processing system includes a first communication node and a second communication node.

The first communication node is configured to send multiple neighbor cell lists; where the neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network.

The second communication node is configured to receive the neighbor cell lists; where the neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network.

When the second core network is not supported, neighbor cells in the neighbor cell list of neighbor cells connected to the first core network are processed; or the communication node processes neighbor cells in the neighbor cell list of neighbor cells connected to only the first core network, and neighbor cells in the neighbor cell list of neighbor cells connected to both the first core network and the second core network.

Or when the second core network is supported, the communication node processes neighbor cells in all neighbor cell lists.

The embodiment of the present application includes: the first communication node sends the neighbor cell lists; where the neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network. In the embodiment of the present application, the first communication node sends the neighbor cell list, that is, the neighbor cell list is independently configured for the neighbor cells connected only to the second core network. In this way, the second communication node that does not support the second core network does not need to process neighbor cells in the neighbor cell list connected only to the second core network, but only needs to process neighbor cells in the neighbor cell list of neighbor cells connected to the first core network, and thereby cell processing failure is not caused and cell processing efficiency is improved.

An embodiment of the present application provides a cell reselection method, apparatus, and system, which can reduce the number of communication nodes that simultaneously issue mobility instructions, and thereby transient signaling storm is reduced.

An embodiment of the present application provides a cell reselection method, and the method includes: a communication node receives a randomized hysteresis threshold; the communication node generates a random number according to the randomized hysteresis threshold; and the communication node performs cell reselection according to the random number.

An embodiment of the present application provides a cell reselection method, and the method includes: a communication node sends a randomized hysteresis threshold.

An embodiment of the present application provides a communication node. The communication node includes a receiving module, a generating module and a reselection module.

The receiving module is configured to receive a randomized hysteresis threshold.

The generating module is configured to generate a random number according to the randomized hysteresis threshold.

The reselection module is configured to perform cell reselection according to the random number.

An embodiment of the present application provides a communication node. The communication node includes a sending module.

The sending module is configured to send a randomized hysteresis threshold.

An embodiment of the present application provides a communication node, and the communication node includes a processor and a computer-readable storage medium, where the computer-readable storage medium stores an instruction which, when executed by the processor, implements any one of the above cell reselection methods.

An embodiment of the present application provides a computer-readable storage medium on which a computer program is stored, where the computer program is executed by a processor to implement any one of the above cell reselection methods.

An embodiment of the present application provides a cell reselection system. The cell reselection system includes a first communication node and a second communication node.

The first communication node is configured to send a randomized hysteresis threshold.

The second communication node is configured to receive the randomized hysteresis threshold; generate a random number according to the randomized hysteresis threshold; and perform cell reselection according to the random number.

An embodiment of the present application includes: a communication node receives a randomized hysteresis threshold; the communication node generates a random number according to the randomized hysteresis threshold; and the communication node performs cell reselection according to the random number. The embodiments of the present application perform cell reselection based on the random number. Since the random number has randomness, specific values of different communication nodes are naturally different. When many concentrated UEs (such as UEs on a train) move at a same time, due to different hysteresis thresholds of all UEs, trigger conditions for cell reselection are also different. Therefore, the number of communication nodes that simultaneously issue mobility instructions for cell reselection is reduced, and a transient signaling storm is reduced.

The embodiments of the present application provide a cell reselection method and a communication node, which can improve service quality.

An embodiment of the present application provides a cell reselection method, and the method includes: a communication node determines a cell equivalent quality interval according to a cell quality equivalent threshold; the communication node performs cell tendency reselection on a candidate cell, where the candidate cell is a set of neighbor cells having quality within the cell equivalent quality interval and a current serving cell.

An embodiment of the present application provides a cell reselection method, and the method includes: a communication node sends at least one of: a cell quality equivalent threshold or a tendency indication of cell reselection.

An embodiment of the present application provides a communication node. The communication node includes a determining module and a reselection module.

The determining module is configured to determine a cell equivalent quality interval according to a cell quality equivalent threshold.

The reselection module is configured to performs cell tendency reselection on a candidate cell, where the candidate cell is a set of neighbor cells having quality within the cell equivalent quality interval and a current serving cell.

An embodiment of the present application provides a communication node and the communication node includes a sending module, which is configured to send at least one of: a cell quality equivalent threshold or a tendency indication of cell reselection.

An embodiment of the present application provides a communication node, and the communication node includes a processor and a computer-readable storage medium, where the computer-readable storage medium stores an instruction which, when executed by the processor, implements any one of the above cell reselection methods.

An embodiment of the present application provides a computer-readable storage medium on which a computer program is stored, where the computer program is executed by a processor to implement any one of the above cell reselection methods.

An embodiment of the present application provides a cell reselection system. The cell reselection system includes a first communication node and a second communication node.

The communication node is configured to send at least one of: a cell quality equivalent threshold or a tendency indication of cell reselection.

The second communication node is configured to determine a cell equivalent quality interval according to a cell quality equivalent threshold; and perform cell tendency reselection on a candidate cell, where the candidate cell is a set of neighbor cells having quality within the cell equivalent quality interval and a current serving cell.

An embodiment of the present application includes: a communication node determines a cell equivalent quality interval according to a cell quality equivalent threshold; and the communication node performs cell tendency reselection on a candidate cell, where the candidate cell is a set of neighbor cells having quality within the cell equivalent quality interval and a current serving cell. In the embodiment of the present application, when the quality of neighbor cells is within the cell equivalent quality interval, the cell tendency reselection is performed to improve the service quality.

Embodiments of the present application provide an energy saving status conversion method, apparatus, and system, which can ensure that UE saves energy while receiving at least one of: downlink data and downlink signaling.

An embodiment of the present application provides an energy saving status conversion method, and the method includes: a base station sends first indication information of releasing a radio resource control connection to the terminal, and sends second indication information of entering energy saving status to a core network element.

An embodiment of the present application provides an energy saving status conversion method, and the method includes: a core network element receives indication information of entering an energy saving status; a connection between a base station corresponding to a terminal and a core network element is kept, and the connection between the base station corresponding to the terminal and the core network element enters the energy saving status; when the connection between the base station corresponding to the terminal and the core network element is in the energy saving status, the base station sends at least one of uplink data or uplink signaling to the core network element at any time; and the core network element sends at least one of downlink data or downlink signaling to the base station within at least one of a paging time window or a predefined data transmission window.

An embodiment of the present application provides a base station. The base station includes a sending module.

The sending module is configured to send first indication information of releasing a radio resource control connection to a terminal, and send second indication information of entering energy saving status to a core network element.

An embodiment of the present application provides a core network element. The core network element includes: a receiving module, which is configured to receive indication information of entering energy saving status; a connection between a base station corresponding to a terminal and a core network element is kept, and the connection between the base station corresponding to the terminal and the core network element enters the energy saving status; when the connection between the base station corresponding to the terminal and the core network element is in the energy saving status, the base station sends at least one of uplink data or uplink signaling to the core network element at any time; and the core network element sends at least one of downlink data or downlink signaling to the base station within at least one of a paging time window or a predefined data transmission window.

An embodiment of the present application provides a base station, and the base station includes a processor and a computer-readable storage medium, where the computer-readable storage medium stores an instruction which, when executed by the processor, implements any one of the above energy saving status conversion methods.

An embodiment of the present application provides a core network element, and the core network element includes a processor and a computer-readable storage medium, where the computer-readable storage medium stores an instruction which, when executed by the processor, implements any one of the above energy saving status conversion methods.

An embodiment of the present application provides a computer-readable storage medium on which a computer program is stored, where the computer program is executed by a processor to implement any one of the above energy saving status conversion methods.

An embodiment of the present application provides an energy saving status conversion system, and the system includes: any one of the above base stations and any one of the above core network elements.

An embodiment of the present application includes: a base station sends first indication information of release a radio resource control connection to the terminal, and sends second indication information of entering energy saving status to a core network element; the core network element receives second indication information of entering an energy saving status; a connection between a base station corresponding to a terminal and a core network element is kept, and the connection between the base station corresponding to the terminal and the core network element enters the energy saving status; when the connection between the base station corresponding to the terminal and the core network element is in the energy saving status, the base station sends at least one of uplink data or uplink signaling to the core network element at any time; and the core network element sends at least one of downlink data or downlink signaling to the base station within at least one of a paging time window or a predefined data transmission window. The downlink data includes at least one of: a paging time window and related parameters of a predefined data transmission window (such as paging eDRX parameters of a non-access stratum (NAS)), and the downlink signaling includes at least one of: the paging time window and related parameters of a predefined data transmission window (such as eDRX parameters of an NAS stratum). In the embodiment of the present application, the connection between the base station corresponding to the terminal and the core network element is kept, and the connection between the base station corresponding to the terminal and the core network element enters the energy saving status, and when the connection between the base station corresponding to the terminal and the core network element is in the energy saving status, the core network element sends at least one of the downlink data or the downlink signaling to the base station within at least one of the paging time window or the predefined data transmission window; therefore, while saving energy, the terminal can receive at least one of: the downlink data or the downlink signaling.

Or, the first communication node receives at least one of: paging extended DRX (eDRX) configuration information, power saving mode (PSM) configuration information, and deep sleep mode (DSM) configuration information.

When the first communication node receives at least one of the downlink data or the downlink signaling outside a paging time window or a predefined data transmission window according to at least one of the eDRX configuration information, the PSM configuration information or the DSM configuration information, the first communication node buffers at least one of the downlink data or downlink signaling.

The first communication node sends a paging message to the second communication node in the paging time window or the predefined data transmission window, and after the second communication node enters a radio resource control connection status or the early data transmission status, sends at least one of the buffered downlink data or downlink signaling to the second communication node.

BRIEF DESCRIPTION OF DRAWINGS

Drawings are provided for a further understanding of the technical solutions of the embodiments of the present application, and constitute a part of the description. The drawings and the embodiments of the present application are used to explain the technical solutions of the embodiments of the present application, and not intended to limit the technical solutions of the embodiments of the present application.

DETAILED DESCRIPTION

Embodiments of the present application will be described in detail below with reference to the drawings. It is to be noted that if not in collision, the above embodiments and features therein in the present application may be combined with each other.

Steps shown in the flowcharts of the drawings may be performed by a computer system such as a group of computer executable instructions. Moreover, although logical sequences are shown in the flowcharts, the shown or described steps may be performed in sequences different from those described herein in some cases.

Figure 1:
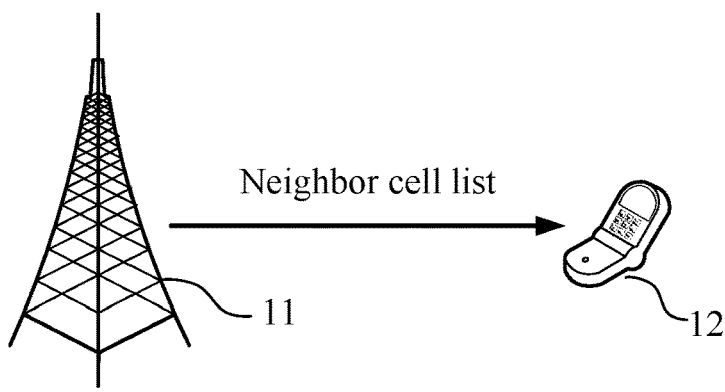
FIG. 1 is a schematic diagram of a base station configuring a neighbor cell list for user equipment in related art.

At present, as shown in FIG. 1, a base station 11 only configures a neighbor cell list for a user equipment (UE) 12. When the UE 12 measures neighbor cells, all neighbor cells in the neighbor cell list are used as target neighbors to be measured; when the UE 12 performs cell reselection, all neighbor cells in the neighbor cell list are regarded as candidate cells.

In the above method, each neighbor cell measurement or cell reselection needs to use all neighbor cells in the neighbor cell list as the target neighbor cells to be measured or the candidate cells for cell reselection. Since some neighbor cells in the neighbor cell list of neighbor cells connected to only an EPC may exist, some neighbor cells are connected to both the EPC and a 5GC, some neighbor cells are only connected to the 5GC, and the UE may support the 5GC or may not support the 5GC, if the UE that does not support the 5GC selects neighbor cells connected to the 5GC during neighbor cell measurement or cell reselection, it will result in inaccurate neighbor cell measurement results or cell reselection failure, and neighbor cell measurement or cell reselection needs to be performed again, which results in lower neighbor cell measurement or cell reselection efficiency.

Figure 2:
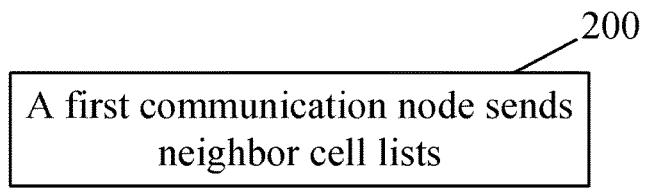
FIG. 2 is a flowchart of a cell processing method according to an embodiment of the present application.

Referring to FIG. 2, an embodiment of the present application proposes a cell processing method, and the method includes a step 200.

In the step 200, a first communication node sends neighbor cell lists.

In the above embodiment of the present application, the first communication node may send the neighbor cell lists by sending a broadcast message, that is, the broadcast message includes the neighbor cell lists.

The neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network.

Figure 3:
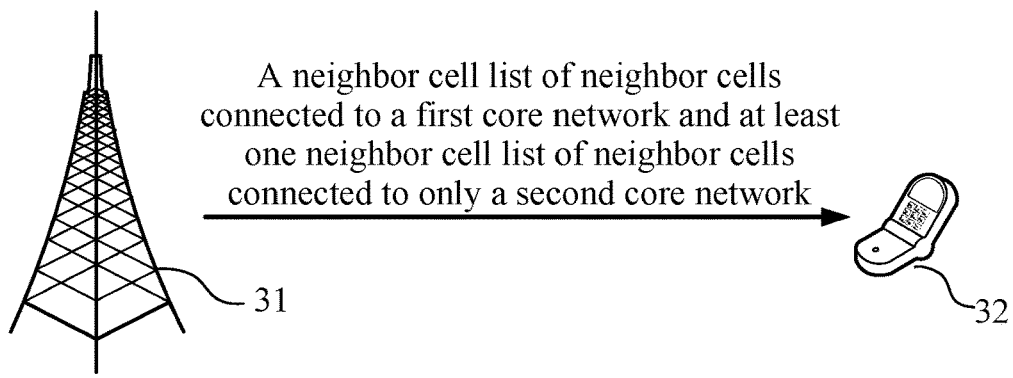
FIG. 3 is a schematic diagram 1 of a first communication node configuring a neighbor cell list for a second communication node according to an embodiment of the present application.

For example, as shown in FIG. 3, a first communication node 31 configures a second communication node 32 with a neighbor cell list of neighbor cells connected to the first core network and at least one neighbor cell list of neighbor cells connected to only the second core network.

Figure 4:
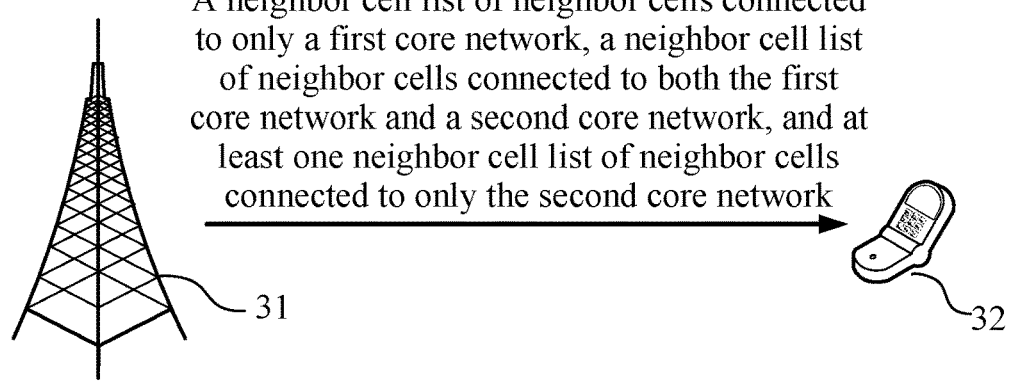
FIG. 4 is a schematic diagram 2 of a first communication node configuring a neighbor cell list for a second communication node according to an embodiment of the present application.

As shown in FIG. 4, the first communication node 31 configures the second communication node 32 with a neighbor cell list of neighbor cells only connected to the first core network, a neighbor cell list of neighbor cells connected to both the first core network and the second core network, and at least one neighbor cell list of neighbor cells connected to only the second core network.

A terminal supporting the second core network also supports the first core network; a terminal supporting the first core network does not necessarily support the second core network. For example, the first core network may be an EPC, and the second core network may be an 5GC.

The neighbor cell list of neighbor cells connected to the first core network or the neighbor cell list of neighbor cells connected to only the first core network may be carried in the field that originally carrying the neighbor cell list in a related broadcast message, and at least one neighbor cell list of neighbor cells connected to only the second core network and the neighbor cell list of neighbor cells connected to both the first core network and the second core network may be carried in a newly added field or an idle field in the broadcast message or an idle bit in the field originally carrying the neighbor cell list.

The neighbor cell list of neighbor cells connected to the first core network includes: neighbor cell information of at least one neighbor cell connected to only the first core network, and neighbor cell information of at least one neighbor cell connected to both the first core network and the second core network.

The neighbor cell list of neighbor cells connected to only the first core network includes: neighbor cell information of at least one neighbor cell connected to only the first core network.

The neighbor cell list of neighbor cells connected to only the second core network includes: neighbor cell information of at least one neighbor cell connected to only the second core network.

The neighbor cell list of neighbor cells connected to both the first core network and the second core network includes: neighbor cell information of at least one neighbor cell connected to both the first core network and the second core network.

That is, the neighbor cell list is independently configured for the neighbor cells connected only to the second core network. In this way, the second communication node that does not support the second core network does not need to process neighbor cells in the neighbor cell list connected only to the second core network, but only needs to process neighbor cells in the neighbor cell list of neighbor cells connected to the first core network, and thereby cell processing failure is not caused and cell processing efficiency is improved.

The above neighbor cell lists include at least one of: an intra-frequency neighbor cell list or an inter-frequency neighbor cell list.

The above neighbor cell lists include neighbor cell information of at least one neighbor cell, and the neighbor cell information includes at least one of: a frequency point, a cell identification (that is, a physical cell ID), a minimum required RX level threshold for a second communication node residing in the cell, a minimum required quality level threshold for the second communication node residing in the cell, a cell reselection offset ($Q_{offset}$), a cell reselection frequency offset (QOffsetFreq), a maximum transmission power ($P_{Max}$) of the second communication node allowed by the cell, a maximum transmission power (additional PMax) of the second communication node allowed by a frequency band, or a neighbor cell characteristic.

The neighbor cell characteristic includes at least one of: the cell connecting the first core network, the cell connecting the second core network, support information of the second core network connected to the cell for a user plane optimization solution, support information of the second core network connected to the cell for an energy saving state of the second communication node, a cell selection weight, or at least one of other optimization characteristics and core network types of the second core network connected to the cell.

The support information of the second core network connected to the cell for a user plane optimization solution includes any one of: the second core network connected to the cell supports the user plane optimization solution, or the second core network connected to the cell does not support the user plane optimization solution.

Support information of the second core network connected to the cell for an energy saving state of the second communication node includes any one of: the second core network connected to the cell supports the energy saving state of the second communication node, or the second core network connected to the cell does not support the energy saving state of the second communication node.

The step in which the second core network supports the user plane optimization solution means that after the UE enters an IDLE mode context suspended state, the next time the service is established, when the service is established next time, the UE connection can be quickly restored by restoring the context of the UE.

The energy saving state includes following characteristics: when the second communication node entering at least one of an extended discontinuous reception (eDRX) state, a low power saving mode (PSM) state or a deep sleep mode (DSM) state, a connection between the first communication node corresponding to the second communication node and a core network element is kept, and the connection between the first communication node corresponding to the second communication node and the core network element enters energy saving status.

When the connection between the first communication node corresponding to the second communication node and the core network element is in an energy saving status, the first communication node may send at least one of uplink data or uplink signaling to the core network element at any time.

The core network element sends at least one of downlink data or downlink signaling to the first communication node in at least one of a paging time window or a predefined data transmission window.

Or, the energy saving state includes the following characteristics.

The first communication node receives at least one of: eDRX configuration information, PSM configuration information, or DSM configuration information.

When the first communication node receives at least one of the downlink data or the downlink signaling outside a paging time window or a predefined data transmission window according to at least one of the eDRX configuration information, the PSM configuration information or the DSM configuration information, the first communication node buffers at least one of the downlink data or downlink signaling.

The first communication node sends a paging message to the second communication node in the paging time window or the predefined data transmission window, and after the second communication node enters a radio resource control connection status or the early data transmission status, sends at least one of the buffered downlink data or downlink signaling to the second communication node.

When the first communication node receives at least one of the downlink data or the downlink signaling in a paging time window or a predefined data transmission window according to at least one of the eDRX configuration information, the PSM configuration information or the DSM configuration information, the first communication node sends a paging message to the second communication node, and after the second communication node enters a radio resource control connection status or the early data transmission status, sends at least one of the downlink data or downlink signaling to the second communication node.

The core network element may send PSM configuration information, eDRX configuration information or DSM configuration information to the first communication node through dedicated signaling.

The dedicated signaling includes any one of: INITIAL CONTEXT SETUP REQUEST, UE CONTEXT RELEASE REQUEST, UE CONTEXT MODIFICATION REQUEST, UE CONTEXT SUSPEND REQUEST, UE CONTEXT RESUME RESPONSE, or a message corresponding to an Ng port.

The PSM configuration information includes at least one of: a PSM activation timer or PSM duration.

The DSM configuration information includes at least one of: a DSM activation timer or DSM duration.

The PSM duration or DSM duration may be implemented by periodic tracking area update (TAU)/routing area update (RAU) timer (such as T3412, T3412 extended value, T3312, or T3312 extended value).

The eDRX configuration information includes at least one of: an eDRX period or a PTW length.

In the above embodiment of the present application, a neighbor cell list may be configured for all neighbor cells connected to only the second core network, or two or more neighbor cell lists may be configured for all neighbor cells connected to only the second core network according to the neighbor cell characteristic.

For example, two neighbor cell lists may be configured for all neighbor cells connected to only the second core network, namely, a neighbor cell list 1 and a neighbor cell list 2; where the neighbor cell characteristic of neighbor cells in the neighbor cell list 1 is that the connected second core network does not support the user plane optimization solution, and the neighbor cell characteristic of neighbor cells in the neighbor cell list 2 is that the connected second core network supports the user plane optimization solution.

Figure 5:
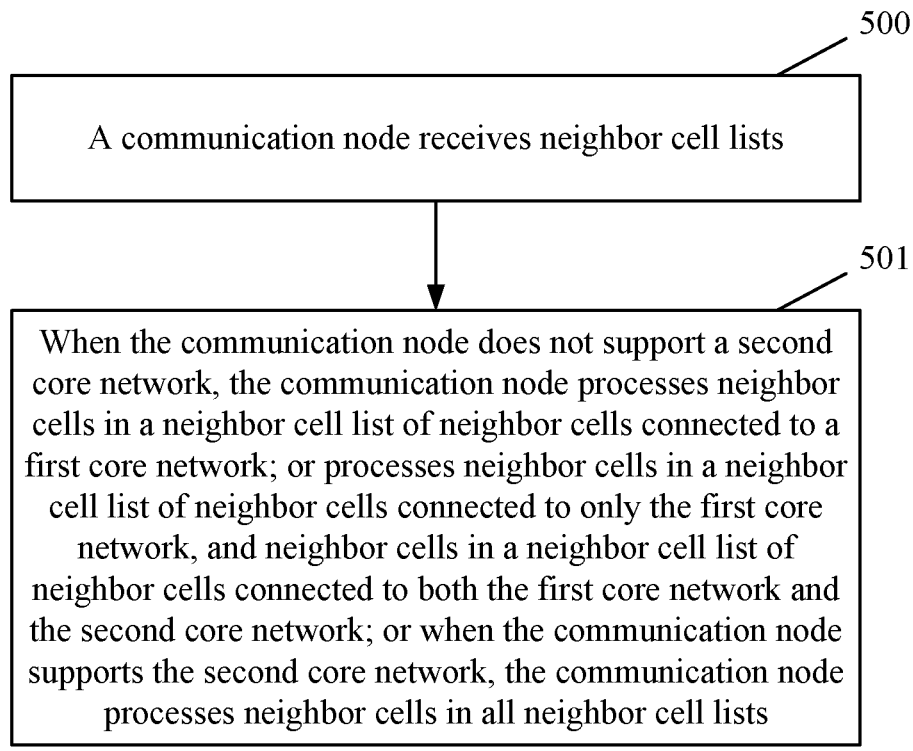
FIG. 5 is a flowchart of another cell processing method according to an embodiment of the present application.

Referring to FIG. 5, an embodiment of the present application proposes a cell processing method, and the method includes a step 500 and a step 501.

In the step 500, a communication node receives neighbor cell lists.

In the above embodiment of the present application, the communication node may receive a broadcast message, and the broadcast message includes the neighbor cell lists.

The neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network.

The neighbor cell list of neighbor cells connected to the first core network includes: neighbor cell information of at least one neighbor cell connected to only the first core network, and neighbor cell information of at least one neighbor cell connected to both the first core network and the second core network.

The neighbor cell list of neighbor cells connected to only the first core network includes: neighbor cell information of at least one neighbor cell connected to only the first core network.

The neighbor cell list of neighbor cells connected to only the second core network includes: neighbor cell information of at least one neighbor cell connected to only the second core network.

The neighbor cell list of neighbor cells connected to both the first core network and the second core network includes: neighbor cell information of at least one neighbor cell connected to both the first core network and the second core network.

That is, the neighbor cell list is independently configured for the neighbor cells connected only to the second core network. In this way, the communication node that does not support the second core network does not need to process neighbor cells in the neighbor cell list connected only to the second core network, but only needs to process neighbor cells in the neighbor cell list of neighbor cells connected to the first core network, and thereby cell processing failure is not caused and cell processing efficiency is improved.

The above neighbor cell lists include at least one of: an intra-frequency neighbor cell list or an inter-frequency neighbor cell list.

The above neighbor cell lists include neighbor cell information of at least one neighbor cell, and the neighbor cell information includes at least one of: a frequency point, a cell identification (that is, a physical cell ID), a minimum required RX level threshold for a communication node residing in the cell, a minimum required quality level threshold for the communication node residing in the cell, a cell reselection offset ($Q_{offset}$), a cell reselection frequency offset ($Q_{OffsetFreq}$), a maximum transmission power ($P_{Max}$) of the communication node allowed by the cell, a maximum transmission power (additional $P_{Max}$) of the communication node allowed by a frequency band, or a cell characteristic.

The cell characteristic includes at least one of: the cell connecting the first core network, the cell connecting the second core network, support information of the second core network connected to the cell for a user plane optimization solution, support information of the second core network connected to the cell for an energy saving state of the communication node, a cell selection weight, or at least one of other optimization characteristics and core network types of the second core network connected to the cell.

The support information of the second core network connected to the cell for a user plane optimization solution includes any one of: the second core network connected to the cell supports the user plane optimization solution, or the second core network connected to the cell does not support the user plane optimization solution.

Support information of the second core network connected to the cell for an energy saving state of the communication node includes any one of: the second core network connected to the cell supports the energy saving state of the communication node, or the second core network connected to the cell does not support the energy saving state of the communication node.

The step in which the second core network supports the user plane optimization solution means that after the UE enters an IDLE mode context suspended state, the next time the service is established, when the service is established next time, the UE connection can be quickly restored by restoring the context of the UE.

In the above embodiment of the present application, a neighbor cell list may be configured for all neighbor cells connected to only the second core network, or two or more neighbor cell lists may be configured for all neighbor cells connected to only the second core network according to the neighbor cell characteristic.

For example, two neighbor cell lists may be configured for all neighbor cells connected to only the second core network, namely, a neighbor cell list 1 and a neighbor cell list 2; where the neighbor cell characteristic of neighbor cells in the neighbor cell list 1 is that the connected second core network does not support the user plane optimization solution, and the neighbor cell characteristic of neighbor cells in the neighbor cell list 2 is that the connected second core network supports the user plane optimization solution.

In the step 501, when the communication node does not support the second core network, the communication node processes neighbor cells in the neighbor cell list of neighbor cells connected to the first core network; or processes neighbor cells in the neighbor cell list of neighbor cells connected to only the first core network, and neighbor cells in the neighbor cell list of neighbor cells connected to both the first core network and the second core network; or when the communication node supports the second core network, the communication node processes neighbor cells in all neighbor cell lists.

In the above embodiment of the present application, a communication node that does not support the second core network may only obtain the neighbor cell list of neighbor cells connected to the first core network or the neighbor cell list of neighbor cells connected to only the first core network from a field originally carrying the neighbor cell list in the broadcast message, and for a newly added field or an idle field in the broadcast message or at least one of idle bits in the field originally carrying the neighbor cell list, the neighbor cell list of neighbor cells connected to only the second core network and the neighbor cell list of neighbor cells connected to both the first core network and the second core network cannot be obtained. Therefore, a communication node that does not support the second core network can only obtain the neighbor cell list of neighbor cells connected to the first core network or the neighbor cell list of neighbor cells connected to only the first core network from the broadcast message.

The communication node supporting the second core network can obtain all neighbor cell lists from the broadcast message.

In the above embodiment of the present application, the step of processing neighbor cells in all neighbor cell lists includes: the communication node performs neighbor cell measurement on a target neighbor cell to be measured, where the target neighbor cell to be measured is union of neighbor cells in the all neighbor cell lists. In an embodiment, the communication node performs neighbor cell measurement on a target neighbor cell to be measured, where the target neighbor cell to be measured is union of neighbor cells in the neighbor cell list of neighbor cells connected to only the first core network and neighbor cells in the at least one neighbor cell list of neighbor cells connected to only the second core network; or performs neighbor cell measurement on a target neighbor cell to be measured, where the target neighbor cell to be measured is union of neighbor cells in the neighbor cell list of neighbor cells connected to only the first core network, neighbor cells in the neighbor cell list of neighbor cells connected to both the first core network and the second core network and neighbor cells in the at least one neighbor cell list of neighbor cells connected to only the second core network.

Or the communication node performs cell reselection on a candidate cell, where the candidate cell is union of neighbor cells in the all neighbor cell lists. In an embodiment, the communication node performs cell reselection on a candidate cell, where the candidate cell is union of is union of neighbor cells in the neighbor cell list of neighbor cells connected to only the first core network and neighbor cells in the at least one neighbor cell list of neighbor cells connected to only the second core network; or performs cell reselection on a candidate cell, where the candidate cell is union of neighbor cells in the neighbor cell list of neighbor cells connected to only the first core network, neighbor cells in the neighbor cell list of neighbor cells connected to both the first core network and the second core network and neighbor cells in the at least one neighbor cell list of neighbor cells connected to only the second core network.

In the above embodiment of the present application, the step of processing neighbor cells in the neighbor cell list of neighbor cells connected to the first core network includes: In an embodiment, the communication node performs neighbor cell measurement on a target neighbor cell to be measured, where the target neighbor cell to be measured is union of neighbor cells in the neighbor cell list of neighbor cells connected to the first core network; or the communication node performs cell reselection on a candidate cell, where the candidate cell is union of is union of neighbor cells in the neighbor cell list of neighbor cells connected to the first core network.

In the above embodiment of the present application, the step of processing neighbor cells in the neighbor cell list of neighbor cells connected to only the first core network and the neighbor cell list of neighbor cells connected to both the first core network and the second core network includes: the communication node performs neighbor cell measurement on a target neighbor cell to be measured, where the target neighbor cell to be measured is union of neighbor cells in the neighbor cell list of neighbor cells connected to only the first core network, neighbor cells in the neighbor cell list of neighbor cells connected to both the first core network and the second core network; or the communication node performs cell reselection on a candidate cell, where the candidate cell is union of neighbor cells in the neighbor cell list of neighbor cells connected to only the first core network, neighbor cells in the neighbor cell list of neighbor cells connected to both the first core network and the second core network.

In the above embodiment of the present application, the second communication node that does not support the second core network does not need to process neighbor cells in the neighbor cell list connected only to the second core network, but only needs to process neighbor cells in the neighbor cell list of neighbor cells connected to the first core network, and thereby cell processing failure is not caused and cell processing efficiency is improved.

It should be noted that the above neighbor cell list may also be replaced by a neighbor cell set.

In an embodiment, the step in which a communication node processes a neighbor cell includes following steps.

The communication node determines a cell equivalent quality interval according to a cell quality equivalent threshold.

When the communication node does not support the second core network, the communication node performs cell tendency reselection on a current serving cell and neighbor cells having quality within the cell equivalent quality interval in the neighbor cell list of neighbor cells connected to the first core network, or the neighbor cell list of neighbor cells connected to only the first core network and the neighbor cell list of neighbor cells connected to both the first core network and the second core network based on matching between cell characteristics with capabilities of the communication node.

Or, when the communication node supports the second core network, the communication node performs cell tendency reselection on the current serving cell and neighbor cells having quality within the cell equivalent quality interval in the all neighbor cell lists based on the matching between the cell characteristics with the capabilities of the communication node.

The capabilities of the communication node refer to whether the communication node supports the second core network. For example, when the cell characteristic is that the cell is connected to the first core network or the second core network, the communication node supporting the second core network preferentially selects the cell connected to the second core network as the serving cell.

The first communication node, the second communication node, and the communication node shown in FIG. 5 may be any communication node. For example, the first communication node is a base station, such as an NB-IoT base station, eMTC base station, etc., and the second communication node is a UE, etc.

Figure 6:
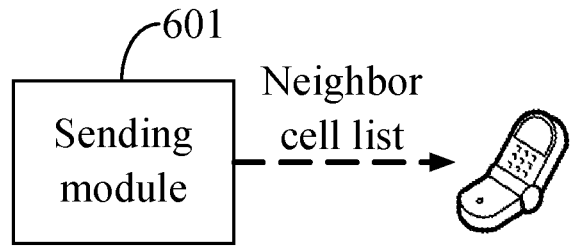
FIG. 6 is a schematic structural composition diagram of a first communication node according to an embodiment of the present application.

Referring to FIG. 6, another embodiment of the present application proposes a communication node, and the communication node includes a sending module 601.

The sending module 601 is configured to send multiple neighbor cell lists; where the neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network.

In an embodiment, the sending module 601 is configured to send a broadcast message, and the broadcast message includes a neighbor cell list.

In an embodiment, the neighbor cell lists include at least one of: an intra-frequency neighbor cell list or an inter-frequency neighbor cell list.

In an embodiment, the neighbor cell list of neighbor cells connected to the first core network includes: neighbor cell information of at least one neighbor cell connected to only the first core network, and neighbor cell information of at least one neighbor cell connected to both the first core network and the second core network.

In an embodiment, the neighbor cell list includes neighbor cell information of at least one neighbor cell, and the neighbor cell information includes at least one of: a frequency point, a cell identification, a minimum required reception level threshold for a second communication node residing in the cell, a minimum required quality level threshold for the second communication node residing in the cell, a reselection offset, a cell reselection frequency offset, a maximum transmission power of the second communication node allowed by the cell, a maximum transmission power of the second communication node allowed by a frequency band, or a cell characteristic.

In an embodiment, the cell characteristic includes at least one of: the cell connecting the first core network, the cell connecting the second core network, support information of the second core network connected to the cell for a user plane optimization solution, support information of the second core network connected to the cell for an energy saving state of the second communication node, or a cell selection weight.

In an embodiment, the energy saving state includes following characteristic: when the second communication node entering at least one of an eDRX state, a PSM state or a DSM state, a connection between the first communication node corresponding to the second communication node and a core network element is kept, and the connection between the first communication node corresponding to the second communication node and the core network element enters energy saving status.

When the connection between the first communication node corresponding to the second communication node and the core network element is in an energy saving status, the first communication node may send at least one of uplink data or uplink signaling to the core network element at any time.

The core network element sends at least one of uplink data or uplink signaling to the first communication node in at least one of a paging time window or a predefined data transmission window.

In an embodiment, the energy saving state includes following characteristic: the first communication node receives at least one of: eDRX configuration information, PSM configuration information, or DSM configuration information.

When the first communication node receives at least one of the downlink data or the downlink signaling outside a paging time window or a predefined data transmission window according to at least one of the eDRX configuration information, the PSM configuration information or the DSM configuration information, the first communication node buffers at least one of the downlink data or downlink signaling.

The first communication node sends a paging message to the second communication node in the paging time window or the predefined data transmission window, and after the second communication node enters a radio resource control connection status or the early data transmission status, sends at least one of the buffered downlink data or downlink signaling to the second communication node.

In an embodiment, the energy saving state includes following characteristic: the first communication node receives at least one of: eDRX configuration information, PSM configuration information, or DSM configuration information.

When the first communication node receives at least one of the downlink data or the downlink signaling in a paging time window or a predefined data transmission window according to at least one of the eDRX configuration information, the PSM configuration information or the DSM configuration information, the first communication node sends a paging message to the second communication node, and after the second communication node enters a radio resource control connection status or the early data transmission status, sends at least one of the downlink data or downlink signaling to the second communication node.

After the terminal receives the paging message, the terminal initiates a PRACH process to enter an RRC connected status or an EDT status.

Figure 7:
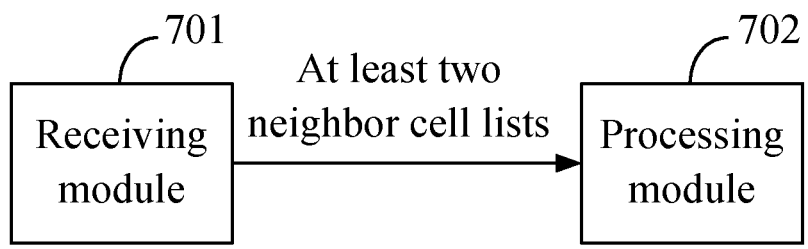
FIG. 7 is a schematic structural composition diagram of a communication node according to an embodiment of the present application.

Referring to FIG. 7, another embodiment of the present application proposes a communication node, and the communication node includes a receiving module 701 and a processing module 702.

The receiving module 701 is configured to receive multiple neighbor cell lists; where the neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network.

The processing module 702 is configured to, when the second core network is not supported, process neighbor cells in the neighbor cell list of neighbor cells connected to the first core network; or neighbor cell list of neighbor cells connected to only the first core network, and neighbor cell list of neighbor cells connected to both the first core network and the second core network; or when the second core network is supported, process neighbor cells in all neighbor cell lists.

In an embodiment, the receiving module 701 is configured to receive a broadcast message, and the broadcast message includes a neighbor cell list.

In an embodiment, the processing module 702 is configured to: perform neighbor cell measurement on a target neighbor cell to be measured, where the target neighbor cell to be measured is union of neighbor cells in the all neighbor cell lists; or perform cell reselection on a candidate cell, where the candidate cell is union of neighbor cells in the all neighbor cell lists.

In an embodiment, the processing module 702 is configured to perform neighbor cell measurement on a target neighbor cell to be measured, where the target neighbor cell to be measured is union of neighbor cells in the neighbor cell list of neighbor cells connected to the first core network, or neighbor cell list of neighbor cells connected to the second core network and neighbor cell list of neighbor cells connected to both the first core network and the second core network; or perform cell reselection on a candidate cell, where the candidate cell is union of neighbor cells in the neighbor cell list of neighbor cells connected to the first core network, or neighbor cell list of neighbor cells connected to the second core network and neighbor cell list of neighbor cells connected to both the first core network and the second core network.

In an embodiment, the neighbor cell list includes neighbor cell information of at least one neighbor cell, and the neighbor cell information includes at least one of: a frequency point, a cell identification, a minimum required reception level threshold for a communication node residing in the cell, a minimum required quality level threshold for the communication node residing in the cell, a cell reselection offset, a cell reselection frequency offset, a maximum transmission power of the communication node allowed by the cell, a maximum transmission power of the communication node allowed by a frequency band, or a cell characteristic.

In an embodiment, the processing module 702 is further configured to determine a cell equivalent quality interval according to a cell quality equivalent threshold, when the second core network is not supported, perform cell tendency reselection on a current serving cell and neighbor cells having quality included within the cell equivalent quality interval in the neighbor cell list of neighbor cells connected to the first core network, or the neighbor cell list of neighbor cells connected to only the second core network and the neighbor cell list of neighbor cells connected to both the first core network and the second core network based on matching between cell characteristics with capabilities of the communication node, or when the second core network is supported, perform cell tendency reselection on the current serving cell and neighbor cells having quality included within the cell equivalent quality interval in the all neighbor cell lists based on the matching between the cell characteristics with the capabilities of the communication node.

Another embodiment of the present application provides a communication node, and the communication node includes a processor and a computer-readable storage medium, where the computer-readable storage medium stores an instruction which, when executed by the processor, implements any one of the above cell processing methods.

Another embodiment of the present application provides a computer-readable storage medium on which a computer program is stored, where the computer program is executed by a processor to implement steps of any one of the above cell processing methods.

The computer-readable storage medium includes at least one of: a flash memory, a hard disk, a multimedia card, a card-type memory (for example, a secure digital (SD) memory card, or a data register (DX) memory, etc.), a random access memory (RAM), a static random access memory (SRAM), a read only memory (ROM), an electrically erasable programmable read-only memory (EEPROM), a programmable read-only memory (PROM), a magnetic memory, a magnetic disks, or an optical disk.

The processor may be a central processing unit (CPU), a controller, a microcontroller, a microprocessor, or other data processing chip.

Figure 8:
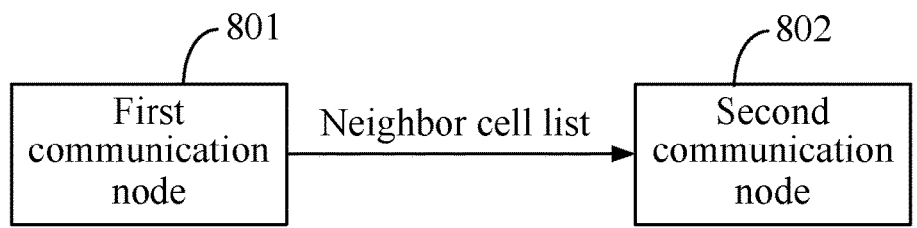
FIG. 8 is a schematic structural composition diagram of a cell processing system according to an embodiment of the present application.

Referring to FIG. 8, another embodiment of the present application provides a cell processing system, and the system includes a first communication node 801 and a second communication node 802.

The first communication node 801 is configured to send neighbor cell lists, where the neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network.

The second communication node 802 is configured to receive the neighbor cell lists; where the neighbor cell lists includes: a neighbor cell list of neighbor cells connected to a first core network and at least one neighbor cell list of neighbor cells connected to only a second core network; or a neighbor cell list of neighbor cells connected to only the first core network, a neighbor cell list of neighbor cells connected to both the first core network and the second core network, and at least one neighbor cell list of neighbor cells connected to only the second core network.

When the second core network is not supported, neighbor cells in the neighbor cell list of neighbor cells connected to the first core network are processed; or neighbor cells in the neighbor cell list of neighbor cells connected to only the first core network, and neighbor cells in the neighbor cell list of neighbor cells connected to both the first core network and the second core network are processed.

Or when the second core network is supported, neighbor cells in all neighbor cell lists are processed.

In an embodiment, the second communication node is further configured to determine a cell equivalent quality interval according to a cell quality equivalent threshold, when the second core network is not supported, perform cell tendency reselection on a current serving cell and neighbor cells having quality included within the cell equivalent quality interval in the neighbor cell list of neighbor cells connected to the first core network, or the neighbor cell list of neighbor cells connected to only the second core network and the neighbor cell list of neighbor cells connected to both the first core network and the second core network based on matching between cell characteristics with capabilities of the communication node, or when the second core network is supported, perform cell tendency reselection on the current serving cell and neighbor cells having quality included within the cell equivalent quality interval in the all neighbor cell lists based on the matching between the cell characteristics with the capabilities of the communication node.

Figure 9:
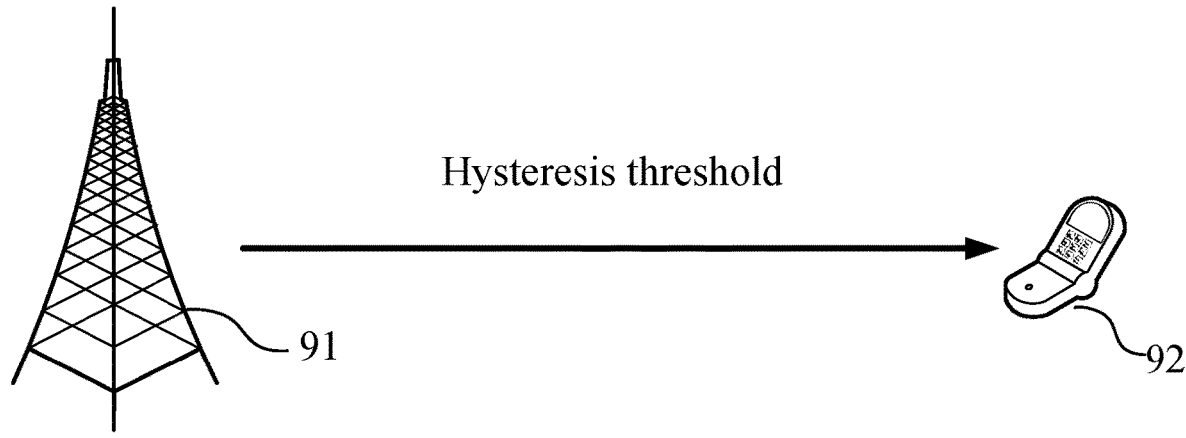
FIG. 9 is a schematic diagram of a network side configuring a hysteresis threshold for a UE in related art.

Currently, as shown in FIG. 9, a R rule of cell reselection is that a network side (such as a base station 91 in FIG. 9) configures a hysteresis value for ranking criteria ($Q_{hyst}$) of R rule for a UE 92, and the UE performs cell reselection based on the hysteresis threshold, that is: quality of the serving cell is calculated according to a formula $R_s = Q_{meas,s} + Q_{hyst} - Q_{offset1} + Q_{offset2}$; quality of the neighbor cell is calculated according to the formula $R_n = Q_{meas,n} - Q_{offset3} - Q_{offset1} + Q_{offset2}$; and when the quality of the neighbor cell is higher than the quality of the serving cell, the UE performs cell reselection.

Rs is the quality of the serving cell, Rn is the quality of the neighbor cell, $Q_{meas,s}$ is a measured value of the serving cell, $Q_{meas,n}$ is a measured value of the neighbor cell, $Q_{offset1}$ is a cell reselection offset or a frequency offset when the cell reselection process is judged, $Q_{offset2}$ is a punitive reselection offset of the cell when the UE fails to access the cell, and $Q_{offset3}$ is a reselection offset of the carrier carrying the single cell point to multi-point (SC-PTM) service to be received.

Generally speaking, $Q_{offset1}$, $Q_{offset2}$ and $Q_{offset3}$ may take the value 0, then the quality of the serving cell may be calculated according to the formula $R_s = Q_{meas,s} + Q_{hyst}$; the quality of the neighbor cell may be calculated according to the formula $R_n = Q_{meas,s}$. That is, when the measurement value of the neighbor cell is greater than the sum of the measurement value of the serving cell and the hysteresis threshold, it means that the quality of the neighbor cell is higher than the quality of the serving cell.

In the above cell reselection methods, when many concentrated UEs (such as UEs on a train) move at a same time, since the hysteresis thresholds of all UEs are the same, the trigger conditions for cell reselection are also the same. Therefore, many UEs simultaneously issue mobility instructions for cell reselection, resulting in a transient signaling storm.

Figure 10:
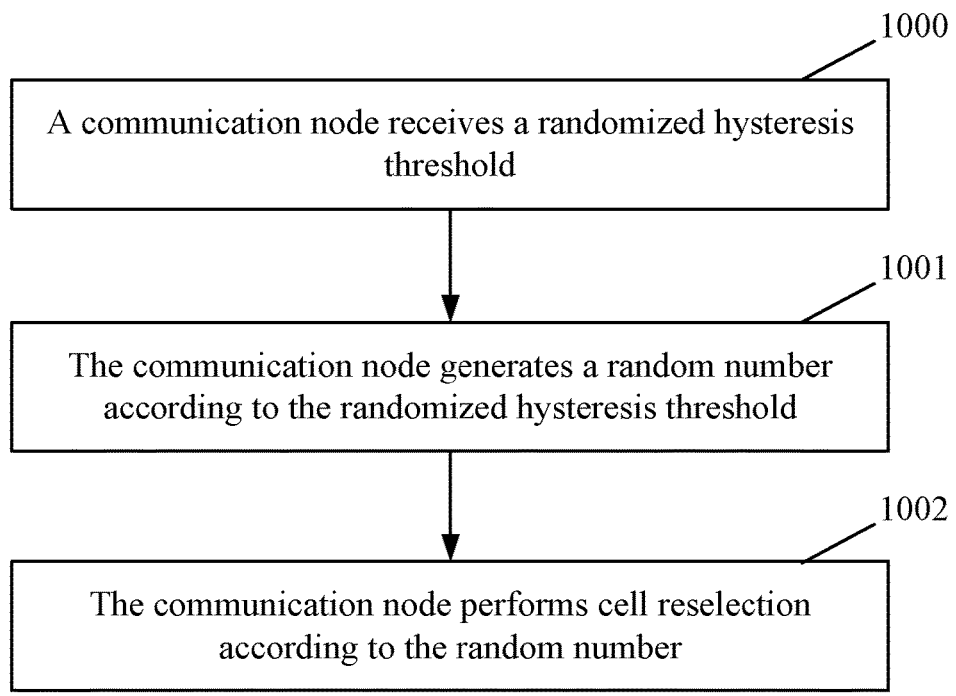
FIG. 10 is a flowchart of a cell reselection method according to an embodiment of the present application.

Referring to FIG. 10, another embodiment of the present application proposes a cell reselection method, and the method includes a step 1000, a step 1001, and a step 1002.

In the step 1000, a communication node receives a randomized hysteresis threshold.

In an embodiment, the communication node may also receive an original hysteresis threshold.

That is, the original hysteresis threshold and the randomized hysteresis threshold may be configured separately or together.

In the above embodiment of the present application, the communication node receives a broadcast message, and the broadcast message includes the randomized hysteresis threshold. In an embodiment, the broadcast message further includes the original hysteresis threshold.

In the step 1001, the communication node generates a random number according to the randomized hysteresis threshold.

In the above embodiment of the present application, the communication node generates the random number according to any one following formulas.

$$Q_{hysy\_offset} = \text{rand}(a,b) Q_{hyst\_R},$$
$$Q_{hys\_offset} = \text{rand}(-aQ_{hyst\_R}, bQ_{hyst\_R})$$

$Q_{hyst\_offset}$ is the random number, $Q_{hyst\_R}$ is the randomized hysteresis threshold, and b is greater than a.

rand (a, b) is a random number between a and b.

As mentioned above, a and b may take any values as long as b is greater than a.

For example, a is 0, b is 1, that is, the random number is calculated according to the formula $$Q_{hyst\_offset}=\text{rand}(0,1)Q_{hyst\_R} \text{ or } Q_{hyst\_offset}=\text{rand}(0, Q_{hyst\_R}).$$

Or, a is −1 and b is 0, that is, the random number is calculated according to the formula $$Q_{hyst\_offset}=\text{rand}(-1,0)Q_{hyst\_R} \text{ or } Q_{hyst\_offset}=\text{rand}(-1, 1)Q_{hyst\_R}.$$

Or a is −1, b is 1, that is, the random number is calculated according to the formula $$Q_{hyst\_offset}=\text{rand}(-Q_{hyst\_R},0) \text{ or } Q_{hyst\_offset}=\text{rand}(-Q_{hyst\_R},Q_{hyst\_R}).$$

That is, the random number may be any one of: a positive number, a negative number, an integer, a decimal, etc.

In the step 1002, the communication node performs cell reselection according to the random number.

In the above embodiment of the present application, first, the communication node calculates a new hysteresis threshold according to the original hysteresis threshold and the random number.

Specifically, the new hysteresis threshold may be calculated in various ways. For example, the new hysteresis threshold is the sum of the original hysteresis threshold and the random number. The specific calculation method is not used to limit the protection scope of the embodiments of the present application, and is not repeated here.

Second, the communication node performs cell reselection according to the new hysteresis threshold.

In an embodiment, the quality of the serving cell is calculated according to the formula $$R_s=Q_{meas,s}+Q_{hystm}-Q_{offset1}+Q_{offset2}.$$

The quality of the neighbor area is calculated according to the formula $$R_n=Q_{meas,n}-Q_{offset3}-Q_{offset1}+Q_{offset2}.$$

When the quality of the neighbor cell is higher than the quality of the serving cell, the UE performs cell reselection.

$R_s$ is the quality of the serving cell, $R_n$ is the quality of the neighbor cell, $Q_{meas,s}$ is a measured value of the serving cell, $Q_{meas,n}$ is a measured value of the neighbor cell, $Q_{hystm}$ is the new hysteresis threshold, $Q_{offset1}$ is a cell reselection offset or a frequency offset when the cell reselection process is judged, $Q_{offset2}$ is a punitive reselection offset of the cell when the UE fails to access the cell, and $Q_{offset3}$ is a reselection offset of the carrier carrying the SC-PTM service to be received.

Generally speaking, $Q_{offset1}$, $Q_{offset2}$ and $Q_{offset3}$ may take the value 0, then the quality of the serving cell may be calculated according to the formula $R_s=Q_{meas,s}+Q_{hystm}$; the quality of the neighbor cell may be calculated according to the formula $R_s=Q_{meas,n}$. That is, when the measurement value of the neighbor cell is greater than the sum of the measurement value of the serving cell and the hysteresis threshold, it means that the quality of the neighbor cell is higher than the quality of the serving cell.

In the above cell reselection method, the cell reselection is based on the random number. Since the random number has randomness, specific values of different communication nodes are naturally different. When many concentrated UEs (such as UEs on a train) move at a same time, due to different hysteresis thresholds of all UEs, trigger conditions for cell reselection are also different. Therefore, the number of communication nodes that simultaneously issue mobility instructions for cell reselection is reduced, and a transient signaling storm is reduced.

Figure 11:
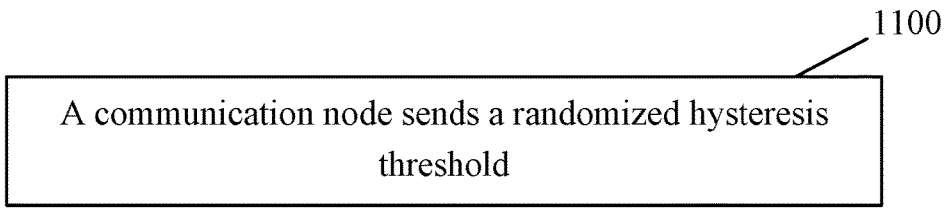
FIG. 11 is a flowchart of another cell reselection method according to an embodiment of the present application.

Referring to FIG. 11, an embodiment of the present application proposes a cell reselection method, and the method includes a step 1100.

In the step 1001, a communication node sends a randomized hysteresis threshold.

In an embodiment, the communication node further sends an original hysteresis threshold.

In the above embodiment of the present application, the communication node may send a randomized hysteresis threshold by sending a broadcast message, that is, the broadcast message includes the randomized hysteresis threshold.

In an embodiment, the broadcast message further includes the original hysteresis threshold.

The above communication node may be any communication node. For example, the communication node in FIG. 10 is a UE, and the communication node in FIG. 11 is a base station.

Figure 12:
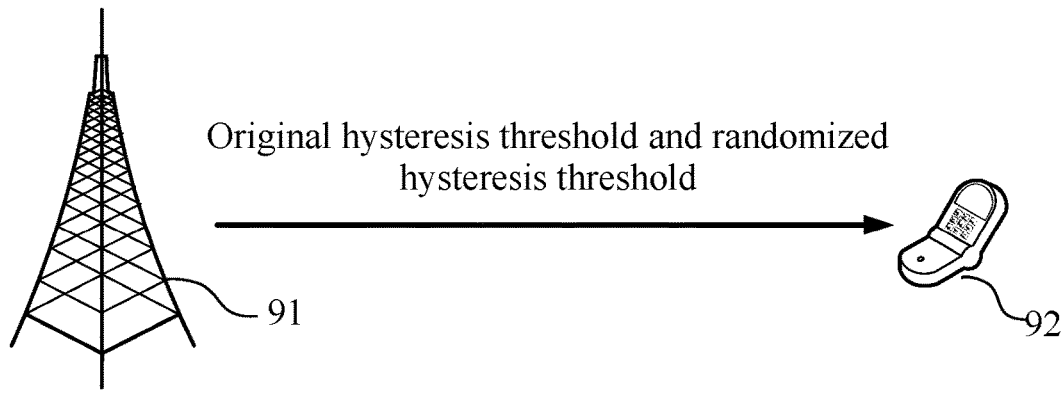
FIG. 12 is a schematic diagram of a network side configuring an original hysteresis threshold and a randomized hysteresis threshold for a UE according to an embodiment of the present application.

For example, as shown in FIG. 12, a base station 91 sends the original hysteresis threshold and the randomized hysteresis threshold to a UE 92. The UE 92 generates a random number according to the randomized hysteresis threshold, calculates a new hysteresis threshold according to the original hysteresis threshold and the randomized hysteresis threshold, and performs cell reselection according to the new hysteresis threshold.

Figure 13:
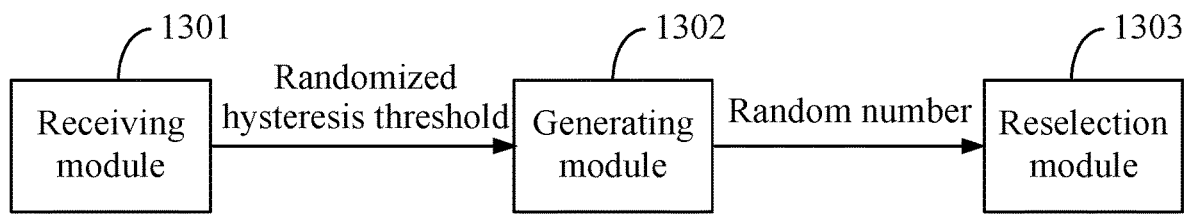
FIG. 13 is a schematic structural composition diagram of another communication node according to an embodiment of the present application.

Referring to FIG. 13, another embodiment of the present application proposes a communication node, and the communication node includes a receiving module 1301, a generating module 1302 and a reselection module 1303.

The receiving module 1301 is configured to receive a randomized hysteresis threshold.

The generating module 1302 is configured to generate a random number according to the randomized hysteresis threshold.

The reselection module 1303 is configured to perform cell reselection according to the random number.

In an embodiment, the generating module 1302 is configured to generate the random number according to any one of following formulas.

$$Q_{hysy\_offset}=\text{rand}(a,b)Q_{hyst\_R}, Q_{hys\_offset}=\text{rand}(-aQ_{hyst\_R},bQ_{hyst\_R})$$

$Q_{hyst\_offset}$ is the random number, $Q_{hyst\_R}$ is the randomized hysteresis threshold, and b is greater than a.

In an embodiment, the a is 0 and the b is 1.

Or, the a is −1 and the b is 0.

Or, the a is −1 and the b is 1.

In an embodiment, the reselection module 1303 is configured to: calculate a new hysteresis threshold according to the original hysteresis threshold and the random number; and perform cell reselection according to the new hysteresis threshold.

In an embodiment, the receiving module 1301 is configured to receive a broadcast message, and the broadcast message includes the randomized hysteresis threshold.

In an embodiment, the broadcast message further includes the original hysteresis threshold.

In an embodiment, the receiving module 1301 is further configured to receive the original hysteresis threshold.

Figure 14:
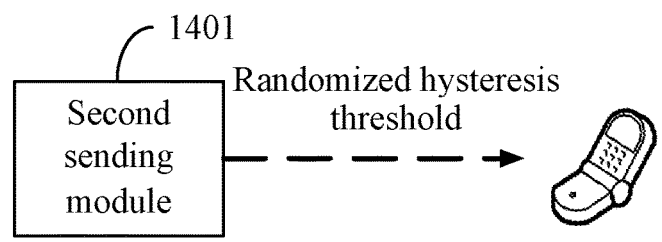
FIG. 14 is a schematic structural composition diagram of another communication node according to an embodiment of the present application.

Referring to FIG. 14, an embodiment of the present application proposes a communication node, and the communication node includes a sending module 1401.

The sending module 1401 is configured to send a randomized hysteresis threshold.

In an embodiment, the sending module 1401 is further configured to send the original hysteresis threshold.

In an embodiment, the sending module 1401 is configured to send a broadcast message, and the broadcast message includes the randomized hysteresis threshold.

In an embodiment, the broadcast message further includes the original hysteresis threshold.

Another embodiment of the present application provides a communication node, and the communication node includes a processor and a computer-readable storage medium, where the computer-readable storage medium stores an instruction which, when executed by the processor, implements any one of the above cell reselection methods.

Another embodiment of the present application provides a computer-readable storage medium on which a computer program is stored, where the computer program is executed by a processor to implement steps of any one of the above cell reselection methods.

Figure 15:
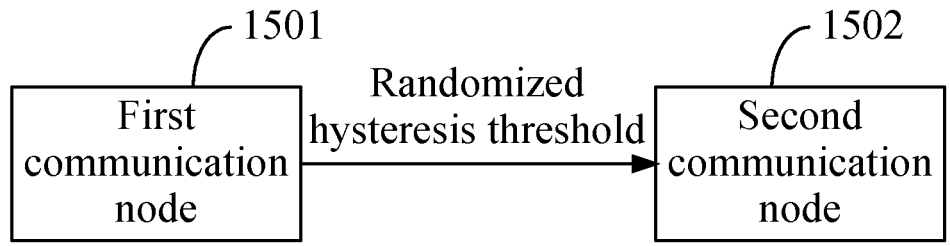
FIG. 15 is a schematic structural composition diagram of a cell reselection system according to an embodiment of the present application.

Referring to FIG. 15, another embodiment of the present application provides a cell reselection system, and the system includes a first communication node 1501 and a second communication node 1502.

The first communication node 1501 is configured to send a randomized hysteresis threshold to the second communication node 1502.

The second communication node 1502 is configured to receive the randomized hysteresis threshold; generate a random number according to the randomized hysteresis threshold; and perform cell reselection according to the random number.

In an embodiment, the first communication node 1501 is further configured to send an original hysteresis threshold to the second communication node 1502.

The second communication node 1502 is configured to receive the randomized hysteresis threshold and the original hysteresis threshold; generate a random number according to the randomized hysteresis threshold; calculate a new hysteresis threshold based on the original hysteresis threshold and the random number; and perform cell reselection according to the new hysteresis threshold.

A current cell selection strategy is sorted by cell radio quality or a cell reselection priority, and a cell with best radio quality or a cell with a highest cell reselection priority is preferentially selected without considering characteristics or load of the cell. The selected cell may not be the cell that can provide the best service quality for the user.

Figure 16:
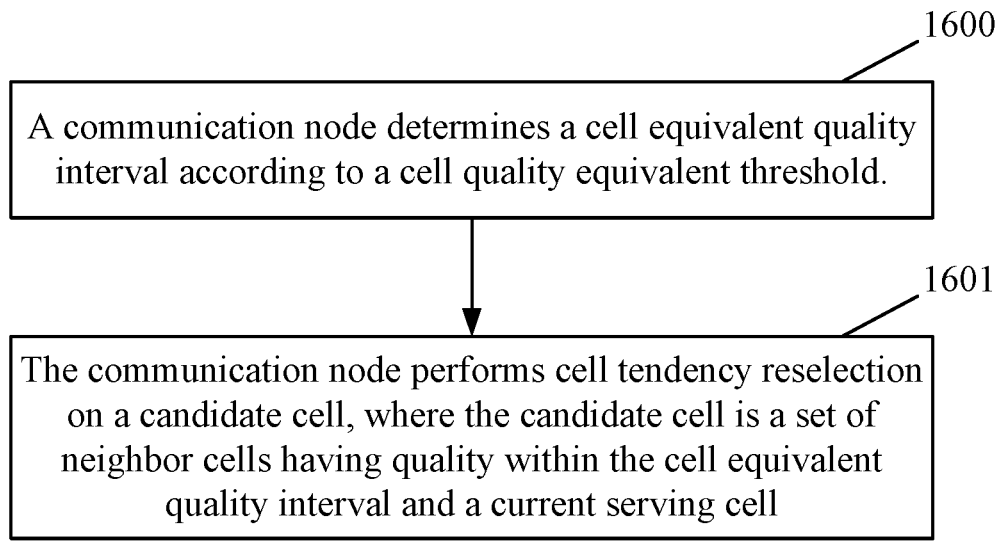
FIG. 16 is a flowchart of another cell reselection method according to an embodiment of the present application.

Referring to FIG. 16, another embodiment of the present application proposes a cell reselection method, and the method includes a step 1600 and a step 1601.

In the step 1600, the communication node determines a cell equivalent quality interval according to a cell quality equivalent threshold.

In the above embodiment of the present application, the cell quality equivalent threshold may use the hysteresis threshold for cell reselection (for example, the above mentioned original hysteresis threshold, or a new hysteresis threshold, etc.).

In the above embodiment of the present application, the cell equivalent quality interval may be any one of:

$[Q_{svr} - Q_{eT}, Q_{svr} + Q_{eT}]$, $[Q_{svr}, Q_{svr} + Q_{eT}]$, $[Q_{svr} - Q_{eT}, Q_{svr}]$ or $[Q_{svr} - Q_{eT1}, Q_{svr} + Q_{eT2}]$.

$Q_{svr}$ is the quality of the current serving cell, and $Q_{eT}$, $Q_{eT1}$ and $Q_{eT2}$ are all cell quality equivalent thresholds.

That is, the cell quality equivalent threshold may have one value, i.e., $Q_{eT}$, or two different values, i.e., $Q_{eT1}$, $Q_{eT2}$.

In the above embodiment of the present application, when the quality of the neighbor cell is within the cell equivalent quality interval, the quality of the neighbor cell is equivalent to the quality of the current serving cell. Although the quality of the neighbor cell is equal to the quality of the current serving cell, the service quality of the neighbor cell may be better than the service quality of the current serving cell. Therefore, the cell tendency reselection is required to improve the service quality.

In the step 1601, the communication node performs cell tendency reselection on a candidate cell, where the candidate cell is a set of neighbor cells having quality within the cell equivalent quality interval and a current serving cell.

In the above embodiments of the present application, the communication node may use any of following methods to perform the cell tendency reselection.

In a first type, the communication node randomly selects a neighbor cell as a serving cell from the set of the neighbor cells having quality within the cell equivalent quality interval and the current serving cell.

In a second type, the communication node receives a tendency indication of cell reselection, and performs the cell tendency reselection according to the tendency indication of cell reselection.

The tendency indication of cell reselection may be carried in a broadcast message.

The tendency indication of the cell reselection includes any one of: a selection tendency for cell reselection, or a cell characteristic.

The cell characteristic includes at least one of: the cell connecting the second core network, the cell connecting the first core network, support information of the second core network connected to the cell for a user plane optimization solution, support information of the second core network connected to the cell for an energy saving state of the communication node, or a cell selection weight.

Then, any one of following methods may be used to perform cell tendency reselection based on the tendency indication of the cell reselection.

In a first type, the communication node selects one of the neighbor cells corresponding to the selection tendency of cell reselection as the serving cell from the neighbor cells with quality within the cell equivalent quality interval.

For example, the selection tendency of cell reselection may be that a fifth communication node supporting the second core network preferentially selects a cell connected to the second core network; in an embodiment, a broadcast message may be used to indicate that the communication node supporting the second core network preferentially selects the cell connected to the second core network.

Then, the communication node directly selects the neighbor cell connected to the second core network as the serving cell; if multiple neighbor cells connected to the second core network exist, one from the neighbor cells connected to the second core network may be selected.

In a second type, when the communication node supports the second core network, the communication node selects one of cells having cell characteristic of connecting the second core network as the serving cell from the neighbor cells having quality within the cell equivalent quality interval.

For example, the cell characteristic refers to whether the cell is connected to the second core network. In an embodiment, the cell characteristics may be indicated by a broadcast message, then the fifth communication node supporting the second core network preferentially selects the cell connected to the second core network through a self-setting rule.

If multiple neighbor cells connected to the second core network exist, one may be arbitrarily selected from neighbor cells connected to the second core network.

In a third type, according to the cell selection weight, the communication node selects a cell as the serving cell from the neighbor cells having quality within the cell equivalent quality interval.

In the method, first, the communication node numbers the neighbor cells having quality within the cell equivalent quality interval and the current serving cell according to a preset order.

Second, use any of following methods to select a neighbor cell as the serving cell.

1. The communication node selects a cell with a smallest number satisfying $$rand\left(0, \sum_{j=0}^{n-1} w(j)\right) \le \sum_{j=0}^{i} w(j)$$

as the serving cell.

w(j) is a weight of a neighbor cell numbered as j (for example, the value is 0 to 100, the greater the value, the greater the probability that the cell is selected), n is a number of neighbor cells having quality within the cell equivalent quality interval, and i is a cell number.

2. When U≤AP(0), the fifth communication node selects a neighbor cell numbered as 0 as the serving cell.
When $$A\sum_{j=0}^{i-1} P(j) \le U \le A\sum_{j=0}^{i} P(j)$$

the fifth communication node selects a neighbor cell numbered as i as the serving cell, where $$P(j) = \frac{w(j)}{\sum_{k=0}^{n-1} w(k)},$$

U=2×(I mod B)+1.

U is a user equipment identifier, P(0) is a probability of selecting a neighbor cell numbered as 0, P(j) is a probability of selecting a neighbor cell numbered as j, I is an identifier of a fifth communication node, w(j) is a weight of a neighbor cell numbered as j, w(k) is a weight of a neighbor cell numbered as k, n is a number of neighbor cells having quality within the cell equivalent quality interval, i is a cell number, and A, B is an integer greater than or equal to 1, for example, A takes a value of 200 and B takes a value of 100.

U is a UEID identifier calculated based on an IMSI.

It is assumed that a probability that the UE selects a certain cell is $$Probability\ (i) = Load\ (i) \bigg/ \sum_{j=0}^{maxCandidate-1} Load\ (j).$$

Load (i) is a load of the i-th cell. If UEID<=200*Probability (0), the UE selects a cell with sequence numbered as 0; if $$200 * \sum_{j=0}^{i-1} Probability\ (j) <= UEID <= 200 * \sum_{j=0}^{i} Probability\ (j)$$

the UE selects a cell with sequence numbered as I, where UEID=(IMSI mod 100)×2+1.

The method provided in the embodiment may determine the residing cell selected by the UE based on the load of the cell and the UEID.

The identity of the communication node may be at least one of: international mobile subscriber identification number (IMSI), temporary mobile subscriber identity (S-TMSI), etc.

Figure 17:
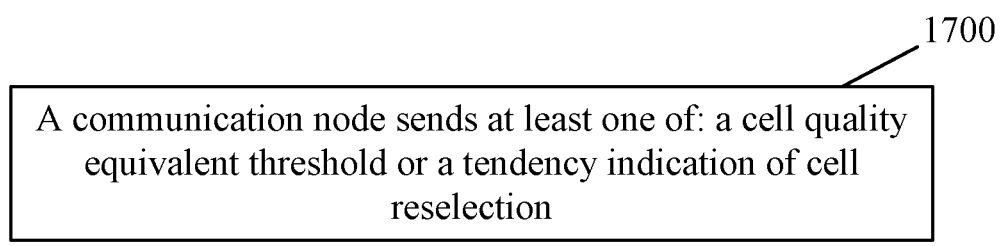
FIG. 17 is a flowchart of another cell reselection method according to an embodiment of the present application.

Referring to FIG. 17, another embodiment of the present application proposes a cell reselection method, and the method includes a step 1700.

In the step 1700, a communication node sends at least one of: a cell quality equivalent threshold or a tendency indication of cell reselection.

In an embodiment, the communication node may indicate at least one of cell quality equivalent threshold or a tendency indication of cell reselection through a broadcast message, that is, the broadcast message carries at least one of the cell quality equivalent threshold and the tendency indication of the cell reselection.

The cell quality equivalent threshold may use the hysteresis threshold for cell reselection (for example, the above mentioned original hysteresis threshold, or a new hysteresis threshold, etc.).

Figure 18:
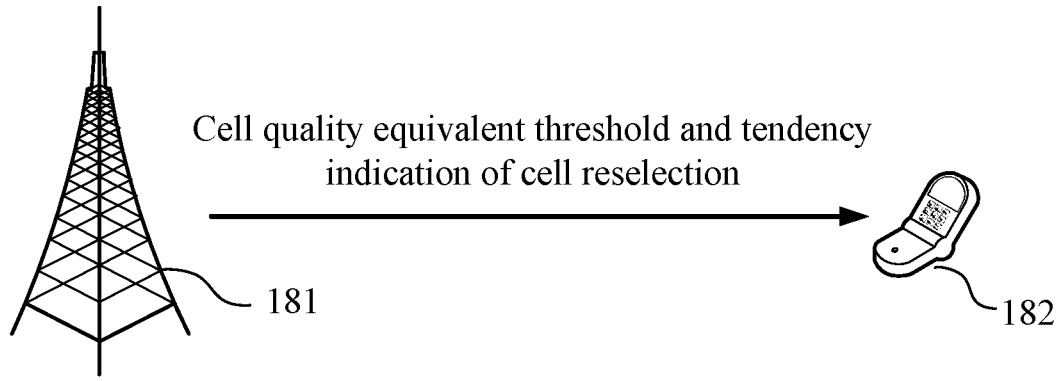
FIG. 18 is a schematic diagram of a UE performing cell reselection based on a cell quality equivalent threshold and a tendency indication of cell reselection configured by a base station according to an embodiment of the application.

For example, as shown in FIG. 18, a base station 181 sends a cell quality equivalent threshold and a tendency indication of cell reselection to a UE 182. The UE 182 determines the cell equivalent quality interval according to the cell quality equivalent threshold, and uses a set of neighbor cells with quality within the cell equivalent quality interval and the current server cell as a candidate cell, and performs cell tendency reselection according to the tendency indication of the cell reselection.

Figure 19:
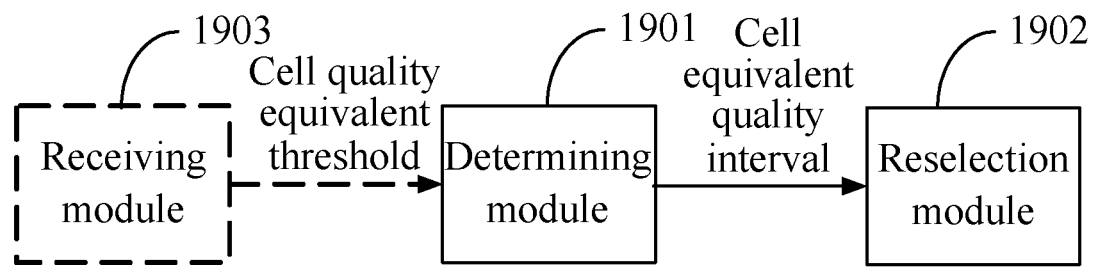
FIG. 19 is a schematic structural composition diagram of another communication node according to an embodiment of the present application.

Referring to FIG. 19, another embodiment of the present application proposes a communication node, and the communication node includes a determining module 1901 and a reselection module 1902.

The determining module 1901 is configured to determine a cell equivalent quality interval according to a cell quality equivalent threshold.

The reselection module 1902 is configured to performs cell tendency reselection on a candidate cell, where the candidate cell is a set of neighbor cells having quality within the cell equivalent quality interval and a current serving cell.

In an embodiment, the communication node further includes a receiving module 1903, which is configured to receive the cell quality equivalent threshold.

In an embodiment, the reselection module 1902 is configured to randomly select a neighbor cell as a serving cell from the set of the neighbor cells with quality within the cell equivalent quality interval and the current serving cell.

In an embodiment, the communication node further includes a receiving module 1903, which is configured to receive a tendency indication of cell reselection; and a reselection module 1902 is configured to perform cell tendency reselection according to the tendency indication of cell reselection.

In an embodiment, the tendency indication of the cell reselection includes any one of a selection tendency for cell reselection or a cell characteristic.

The cell characteristic includes at least one of: the cell connecting the second core network, the cell connecting the first core network, support information of the second core network connected to the cell for a user plane optimization solution, support information of the second core network connected to the cell for an energy saving state of the second communication node, or a cell selection weight.

In an embodiment, the reselection module 1902 is configured to use any one of following methods for cell tendency reselection: selecting a cell corresponding to the selection tendency of the cell reselection as a serving cell from a set of the neighbor cells having quality within the cell equivalent quality interval and the current serving cell; when the second core network is supported, selecting one of cells having cell characteristic of connecting the second core network as the serving cell from the set of the neighbor cells having quality within the cell equivalent quality interval and the current serving cell; or selecting a cell as the serving cell from the set of the neighbor cells having quality within the cell equivalent quality interval and the current serving cell according to the cell selection weight.

In an embodiment, the reselection module 1902 is configured to: number the neighbor cells having quality within the cell equivalent quality interval and the current serving cell according to a preset order; and select a cell with a smallest number satisfying $$rand\left(0, \sum_{j=0}^{n-1} w(j)\right) \le \sum_{j=0}^{i} w(j)$$

as the serving cell; where w(j) is a weight of a neighbor cell numbered as j, n is a number of neighbor cells having quality within the cell equivalent quality interval, and i is a cell number.

In an embodiment, the reselection module 1902 is configured to: number the neighbor cells having quality within the cell equivalent quality interval and the current serving cell according to a preset order; and when U≤AP(0), select the neighbor cell numbered as 0 as the serving cell; or when $$A\sum_{j=0}^{i-1} P(j) \le U \le A\sum_{j=0}^{i} P(j),$$

select the neighbor cell numbered as i as the serving cell; where $$P(j) = \frac{w(j)}{\sum_{k=0}^{n-1} w(k)},$$

U=2×(I mod B)+1; and P(0) is a probability of selecting a neighbor cell numbered as 0, P(j) is a probability of selecting a neighbor cell numbered as j, I is an identifier of a communication node, w(j) is a weight of a neighbor cell numbered as j, w(k) is a weight of a neighbor cell numbered as k, n is a number of neighbor cells having quality within the cell equivalent quality interval, i is a cell number, and A, B is an integer greater than or equal to 1.

Figure 20:
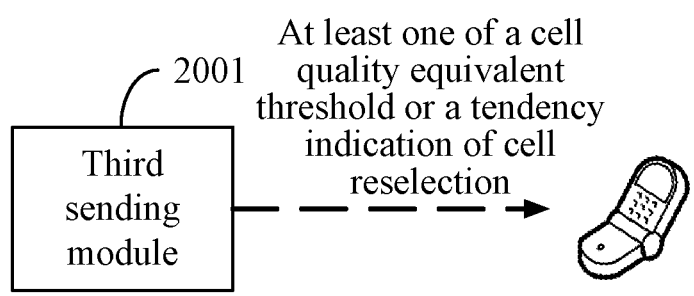
FIG. 20 is a schematic structural composition diagram of another communication node according to an embodiment of the present application.

Referring to FIG. 20, another embodiment of the present application proposes a communication node, and the communication node includes a sending module 2001.

The sending module is configured to send at least one of: a cell quality equivalent threshold or a tendency indication of cell reselection.

Another embodiment of the present application provides a communication node, and the communication node includes a processor and a computer-readable storage medium, where the computer-readable storage medium stores an instruction which, when executed by the processor, implements any one of the above cell reselection methods.

An embodiment of the present application provides a computer-readable storage medium on which a computer program is stored, where the computer program is executed by a processor to implement any one of the above cell reselection methods.

Figure 21:
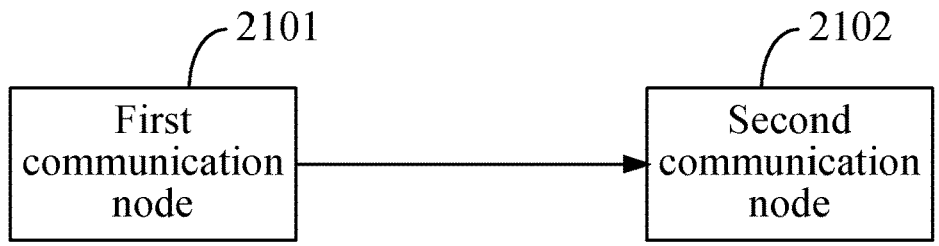
FIG. 21 is a schematic structural composition diagram of another cell reselection system according to an embodiment of the present application.

Referring to FIG. 21, another embodiment of the present application provides a cell reselection system, and the system includes a first communication node 2101 and a second communication node 2102.

The first communication node 2101 is configured to send a cell quality equivalent threshold.

The second communication node 2102 is configured to determine a cell equivalent quality interval according to a cell quality equivalent threshold; and perform cell tendency reselection on a candidate cell, where the candidate cell is a set of neighbor cells having quality within the cell equivalent quality interval and a current serving cell.

In an embodiment, the first communication node 2101 is further configured to send a tendency indication of cell reselection.

The second communication node 2102 is configured to determine a cell equivalent quality interval according to a cell quality equivalent threshold; and perform cell tendency reselection on a candidate cell according to the tendency indication of cell reselection, where the candidate cell is a set of neighbor cells having quality within the cell equivalent quality interval and a current serving cell.

In the related art, after the UE enters a radio resource control (RRC) idle mode context suspended state, the UE is in the RRC IDLE mode context suspended state within the length of the paging time window (PTW) of the eDRX cycle, and if the UE does not have data transmission and reception within the PTW length of the eDRX cycle, the UE enters the eDRX state within the non-PTW length of the period; if the UE has data transmission and reception within the PTW length of the eDRX period, the UE enters the connected state.

Or, when the UE is in the RRC IDLE mode context suspended state in the PSM active timer (or T3324), and if the UE does not have data transmission and reception in the PSM active timer, the UE enters the PSM state within the PSM duration; and the UE exits the PSM state during the PSM duration (that is, re-enter the PSM active timer and stay in the RRC IDLE mode context suspended state in the PSM active timer).

In the related art, when the UE is in the eDRX or PSM state, the connection between the base station corresponding to the UE and the core network needs to be disconnected. When the connection between the base station corresponding to the UE and the core network is kept, the UE cannot enter the eDRX or PSM state, that is, when the connection between the base station corresponding to the UE and the core network is kept, the UE cannot save energy; when the UE enters the eDRX or PSM state, the core network cannot send downlink data to the UE.

Figure 22:
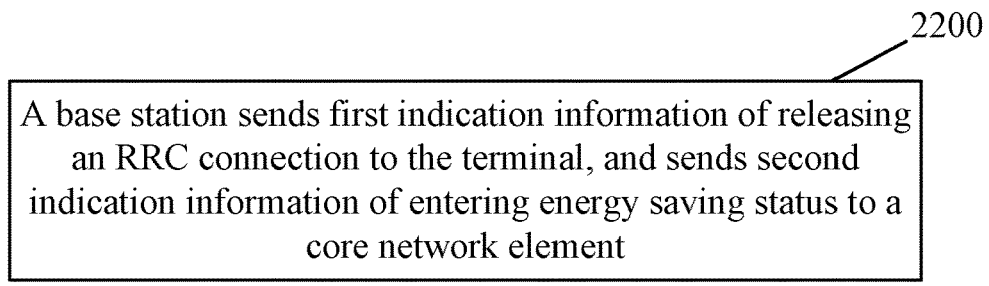
FIG. 22 is a flowchart of an energy saving status conversion method according to an embodiment of the present application.

Referring to FIG. 22, another embodiment of the present application proposes an energy saving status conversion method, and the method includes a step 2200.

In the step 2200, a base station sends first indication information of releasing a RRC connection to the terminal, and sends second indication information of entering energy saving status to a core network element.

In the above embodiment of the present application, after receiving the first indication information, the terminal enters the RRC IDLE mode context suspended state; and after the terminal enters the RRC IDLE mode context suspended state, the terminal is in the RRC IDLE mode context suspended state (monitoring at least one of a paging message or downlink scheduling information) in the PTW window of the eDRX cycle, and if the terminal does not have data transmission and reception within the PTW length of the eDRX cycle, the terminal enters the eDRX state in the non-PTW window of the eDRX period; if the terminal monitors at least one of the paging message or the downlink scheduling information in the PTW window of the eDRX period, the terminal enters the subsequent uplink and downlink sending and receiving state.

Or, when the terminal is in the RRC IDLE mode context suspended state in the PSM active timer, and if the terminal does not have data transmission and reception in the PSM active timer (or T3322), the terminal enters the PSM state within the PSM duration; and the terminal exits the PSM state during the PSM duration (that is, re-enter the PSM active timer and stay in the RRC IDLE mode context suspended state in the PSM active timer).

Or, when the terminal is in the RRC IDLE mode context suspended state in the DSM active timer, and if the terminal does not have data transmission and reception in the DSM active timer (or T3322), the terminal enters the DSM state within the DSM duration; and the terminal exits the DSM state during the PSM duration (that is, re-enter the DSM active timer and stay in the RRC IDLE mode context suspended state in the DSM active timer).

In another embodiment of the above present application, after a core network element receives second indication information, a connection between a base station corresponding to a terminal is kept and the connection between the base station corresponding to the terminal and the core network element enters an energy saving status.

When the connection between the base station corresponding to the terminal and the core network element is in the energy saving status, the base station sends at least one of uplink data or uplink signaling to the core network element at any time.

The core network element sends at least one of downlink data or downlink signaling to the base station in at least one of a paging time window or a predefined data transmission window.

In an embodiment, before the base station sends the first indication information for releasing the RRC connection to the terminal, the method further includes: the base station receives third indication information that the core network element supports the energy saving status of the terminal.

In an embodiment, the method further includes: the base station receives at least one of: downlink data or downlink signaling; the downlink data includes at least one of: a paging time window or predefined data transmission window related parameters (for example, eDRX parameters at a NAS layer), and the downlink signaling includes at least one of: a paging time window or predefined data transmission window related parameters (such as eDRX parameters at the NAS layer).

A paging message is sent to the terminal, and the connection between a base station corresponding to the terminal and a core network element enters a connected status.

Since after the terminal enters the RRC IDLE mode context suspended state, the core network element can only send at least one of downlink data or downlink signaling to the base station within at least one of the PTW or the predefined data transmission window, the base station can only receive at least one of the downlink data or downlink signaling in at least one of the PTW and the data transmission window.

That is, only when the terminal is in the RRC IDLE mode context suspended state, the core network element can send at least one of the downlink data or downlink signaling to the base station, and when the terminal is in eDRX, PSM state or DSM state, the core network element cannot send at least one of the downlink data or downlink signaling to the base station, and the terminal monitors the paging message in at least one of the PTW or the predefined data transmission window.

After the terminal receives the paging message, the terminal initiates a physical random access channel (PRACH) process to enter a RRC connected status or an early data transmission (EDT) state.

After the terminal enters the RRC connected status or the EDT status, the base station may send the received downlink data and downlink signaling to at least one of the terminals.

After the connection between the base station corresponding to the terminal and the core network element enters the connected status, at least one of data and signaling can be arbitrarily sent and received between the base station and the core network element.

In an embodiment, the method further includes: the base station receives at least one of uplink data or uplink signaling, and sends at least one of the uplink data or uplink signaling to the core network element; the connection between the base station corresponding to the terminal and the core network element enters the connected status.

The terminal may actively initiate the PRACH process at any time to enter the RRC connected status or EDT status. After the terminal enters the RRC connected status or EDT status, the terminal may send at least one of the uplink data and uplink signaling to the base station.

After the connection between the base station corresponding to the terminal and the core network element enters the connected status, at least one of data and signaling can be arbitrarily sent and received between the base station and the core network element.

Figure 23:
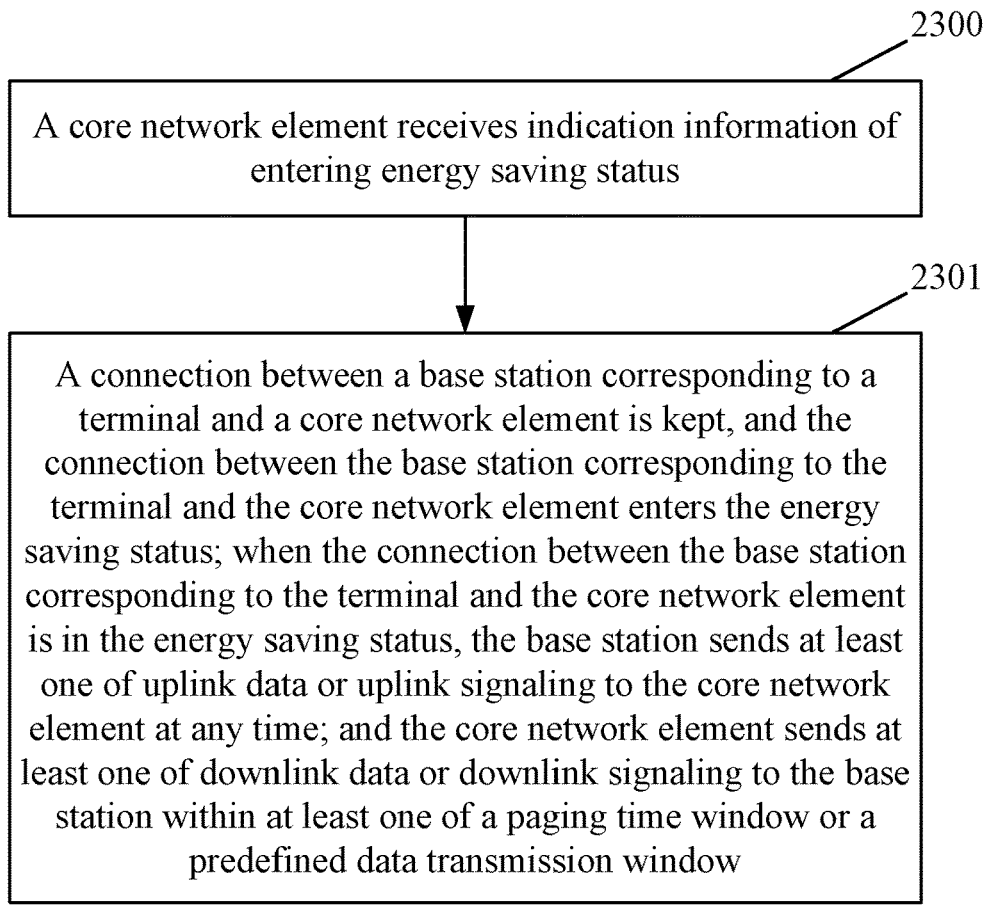
FIG. 23 is a flowchart of another energy saving status conversion method according to an embodiment of the present application.

Referring to FIG. 23, another embodiment of the present application proposes an energy saving status conversion method, and the method includes a step 2300 and a step 2301.

In the step 2300, a core network element receives indication information of entering energy saving status.

In the step 2301, a connection between a base station corresponding to a terminal and a core network element is kept, and the connection between the base station corresponding to the terminal and the core network element enters the energy saving status; when the connection between the base station corresponding to the terminal and the core network element is in the energy saving status, the base station sends at least one of uplink data or uplink signaling to the core network element at any time; and the core network element sends at least one of downlink data or downlink signaling to the base station within at least one of a paging time window or a predefined data transmission window.

In an embodiment, before the core network element receives the second indication information of entering the energy saving status, the method further includes: the core network element sends the third indication information of the core network element supporting the energy saving status to the base station.

In an embodiment, the core network element may send the third indication information to the base station through public signaling.

The public signaling includes at least one of: an Si setup response, a mobility management entity (MME) configuration update message, or a message corresponding to an Ng port.

The third indication information includes at least one of: eDRX configuration information, PSM configuration information, or DSM configuration information.

When the first communication node receives at least one of the downlink data or the downlink signaling outside a paging time window or a predefined data transmission window according to at least one of the eDRX configuration information, the PSM configuration information or the DSM configuration information, the first communication node buffers at least one of the downlink data or downlink signaling.

The first communication node sends a paging message to the second communication node in the paging time window or the predefined data transmission window, and after the second communication node enters a radio resource control connection status or the early data transmission status, sends at least one of the buffered downlink data or downlink signaling to the second communication node.

In an embodiment, the method further includes: the core network element sends at least one of downlink data or downlink signaling to the base station within at least one of a paging time window or a predefined data transmission window, and a connection between the base station corresponding to the terminal and the network element of the core network enters a connected status.

In an embodiment, the method further includes: the core network element receives at least one of uplink data or uplink signaling; and the connection between the base station corresponding to the terminal and the core network element enters the connected status.

Figure 24:
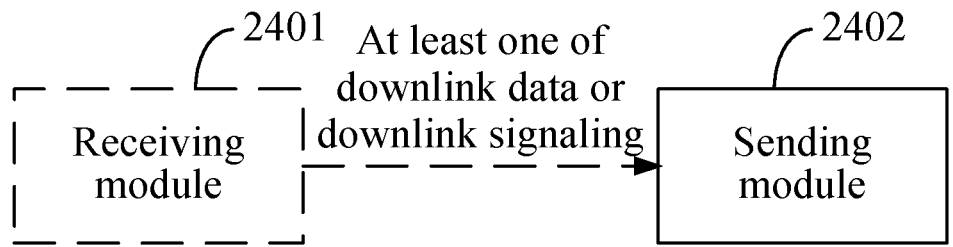
FIG. 24 is a schematic structural composition diagram of a base station according to an embodiment of the present application.

Referring to FIG. 24, another embodiment of the present application proposes a base station, and the base station includes a sending module 2402.

The sending module 2402 is configured to send first indication information of releasing a radio resource control connection to a terminal, and send second indication information of entering energy saving status to a core network element.

In an embodiment, the base station further includes a receiving module 2401.

The receiving module 2401 is configured to receive third indication information indicating that the core network element supports the energy saving status of the terminal.

In an embodiment, the base station further includes: a receiving module 2401, which is configured to receive at least one of downlink data or downlink signaling. The sending module 2402 is further configured to send a paging message to the terminal, where the connection between a base station corresponding to the terminal and a core network element enters a connected status.

In an embodiment, the base station further includes: a receiving module 2401, which is configured to receive at least one of uplink data or uplink signaling. The sending module 2402 is further configured to send at least one of the uplink data or uplink signaling to the core network element; and the connection between the base station corresponding to the terminal and the core network element enters the connected status.

Figure 25:
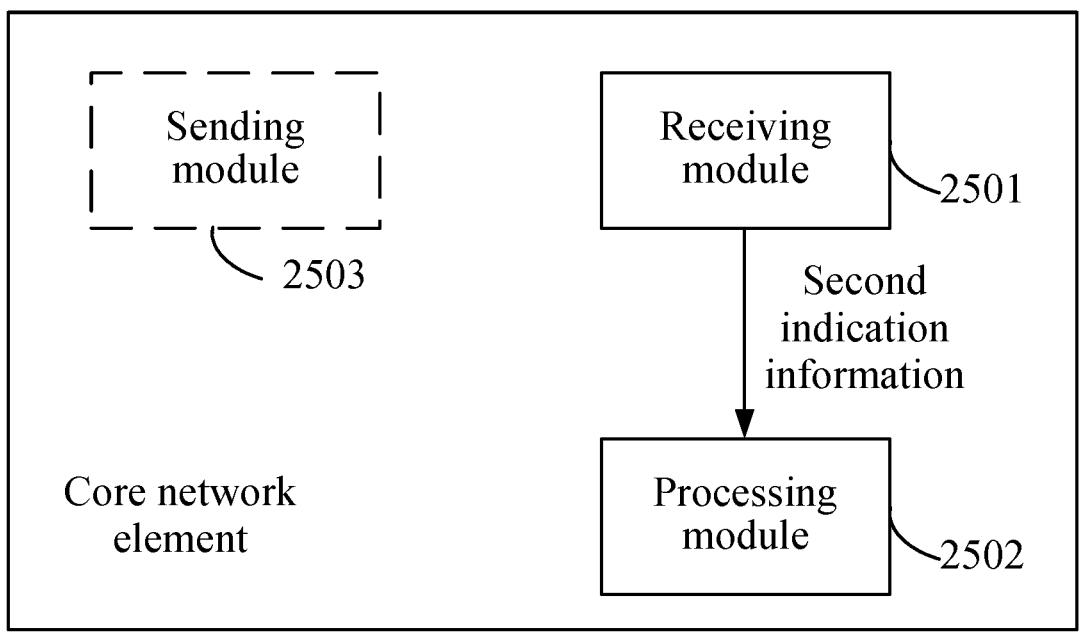
FIG. 25 is a schematic structural composition diagram of a core network element according to an embodiment of the present application.

Referring to FIG. 25, another embodiment of the present application proposes a core network element, and the core network element includes a receiving module 2501 and a processing module 2502.

The receiving module 2501 is configured to receive indication information of entering energy saving status; The processing module 2502 is configured to keep a connection between a base station corresponding to a terminal and a core network element, where the connection between the base station corresponding to the terminal and the core network element enters the energy saving status; when the connection between the base station corresponding to the terminal and the core network element is in the energy saving status, the base station sends at least one of uplink data or uplink signaling to the core network element at any time; and the core network element sends at least one of downlink data or downlink signaling to the base station within at least one of a paging time window or a predefined data transmission window.

In an embodiment, a sending module 2503 is included.

The sending module 2503 is configured to send third indication information indicating that the core network element supports the energy saving status of the terminal to a base station.

In an embodiment, the receiving module 2501 is further configured to send at least one of downlink data or downlink signaling to the base station in at least one of the paging time window or the predefined data transmission window. The connection between the base station corresponding to the terminal and the core network element enters a connected status; or at least one of uplink data or uplink signaling is received, and the connection between the base station corresponding to the terminal and the core network element enters the connected status.

Figure 27:
FIG. 27 is a schematic diagram of a core network element sending third indication information to a base station according to an embodiment of the present application.

In an embodiment, before the core network element receives the second indication information of entering the energy saving status, the method further includes: the core network element sends the third indication information of the core network element supporting the energy saving status to the base station. FIG. 27 is a schematic diagram of a core network element 2702 sending a third indication information to a base station 2701.

In an embodiment, the core network element may send the third indication information to the base station through public signaling.

The public signaling includes at least one of: an Si setup response, a mobility management entity (MME) configuration update message, or a message corresponding to an Ng port.

In an embodiment, the core network may send the third indication information to the base station through UE dedicated signaling.

The dedicated signaling may be any one of: INITIAL CONTEXT SETUP REQUEST, UE CONTEXT RELEASE REQUEST, UE CONTEXT MODIFICATION REQUEST, UE CONTEXT SUSPEND REQUEST, UE CONTEXT RESUME RESPONSE, and a message corresponding to an Ng port.

The third indication information includes at least one of: eDRX configuration information, PSM configuration information, or DSM configuration information.

When the first communication node receives at least one of the downlink data or the downlink signaling outside a paging time window or a predefined data transmission window according to at least one of the eDRX configuration information, the PSM configuration information or the DSM configuration information, the first communication node buffers at least one of the downlink data or downlink signaling.

The first communication node sends a paging message to the second communication node in the paging time window or the predefined data transmission window, and after the second communication node enters a radio resource control connection status or the early data transmission status, sends at least one of the buffered downlink data or downlink signaling to the second communication node. The PSM configuration information includes at least one of: a PSM activation timer or PSM duration.

The DSM configuration information includes at least one of: a DSM activation timer or DSM duration.

The PSM duration or DSM duration may be implemented by periodic tracking area update (TAU)/routing area update (RAU) timer (such as T3412, T3412 extended value, T3312, or T3312 extended value).

The eDRX configuration information includes at least one of: an eDRX period or a paging time window (PTW) length.

Another embodiment of the present application provides a base station, and the base station includes a processor and a computer-readable storage medium, where the computer-readable storage medium stores an instruction which, when executed by the processor, implements any one of the above energy saving status conversion methods.

Another embodiment of the present application provides a core network element, and the core network element includes a processor and a computer-readable storage medium, where the computer-readable storage medium stores an instruction which, when executed by the processor, implements any one of the above energy saving status conversion methods.

An embodiment of the present application provides a computer-readable storage medium on which a computer program is stored, where the computer program is executed by a processor to implement any one of the above energy saving status conversion methods.

Figure 26:
FIG. 26 is a schematic structural composition diagram of an energy saving status conversion system according to an embodiment of the present application.

Referring to FIG. 26, an embodiment of the present application provides an energy saving status conversion system, and the system includes: any one of the above base stations 2601 and any one of the above core network elements 2602.

What is claimed is:

1. A method for wireless communication, the method comprising:
    receiving, by a first communication node, extended discontinuous reception (eDRX) configuration information through a dedicated signaling from a core network element, wherein the eDRX configuration information comprises a paging time window (PTW) length;
    receiving, by the first communication node, at least one of the downlink data or the downlink signaling in a paging time window, wherein the paging time window is configured according to the PTW length;
    receiving, by the first communication node, at least one of the downlink data or the downlink signaling outside the paging time window;
    buffering, by the first communication node, the at least one of the downlink data or downlink signaling outside the paging time window;
    sending, by the first communication node, a paging message to a second communication node in the paging time window; and
    sending, by the first communication node, at least one of the downlink data, the downlink signaling, the buffered downlink data, or the buffered downlink signaling to the second communication node after the second communication node enters a radio resource control connection status.

2. The method according to claim 1, wherein the dedicated signaling includes an INITIAL CONTEXT SETUP REQUEST message or a UE CONTEXT MODIFICATION REQUEST message.

3. The method according to claim 1, wherein a connection between the first communication node corresponding to the second communication node and a core network element is maintained.

4. A first communication node comprising a processor and a computer-readable storage medium, wherein the computer-readable storage medium stores an instruction which, when executed by the processor, implements a method according to claim 1.

5. The first communication node according to claim 4, wherein the dedicated signaling includes an INITIAL CONTEXT SETUP REQUEST message or a UE CONTEXT MODIFICATION REQUEST message.

6. The first communication node according to claim 4, wherein a connection between the first communication node corresponding to the second communication node and a core network element is maintained.

* * * * *